(12) United States Patent
Tillery et al.

(10) Patent No.: US 10,706,665 B2
(45) Date of Patent: Jul. 7, 2020

(54) BUTTON PANEL ASSEMBLY AND SECURITY SYSTEM FOR A GAMING DEVICE

(71) Applicant: AGS LLC, Las Vegas, NV (US)

(72) Inventors: James Ely Tillery, Atlanta, GA (US); Adam Daniel Ambrecht, Kennesaw, GA (US); Kevin Berwick Green, Atlanta, GA (US)

(73) Assignee: AGS LLC, Las Vegas, NV (US)

( * ) Notice: Subject to any disclaimer, the term of this patent is extended or adjusted under 35 U.S.C. 154(b) by 6 days.

(21) Appl. No.: 16/135,227

(22) Filed: Sep. 19, 2018

(65) Prior Publication Data

US 2020/0090462 A1 Mar. 19, 2020

(51) Int. Cl.
*G07F 17/32* (2006.01)
*A63F 13/90* (2014.01)

(52) U.S. Cl.
CPC .......... *G07F 17/3216* (2013.01); *A63F 13/90* (2014.09)

(58) Field of Classification Search
CPC .............................. G07F 17/3216; A63F 13/90
See application file for complete search history.

(56) References Cited

U.S. PATENT DOCUMENTS

| 3,665,736 | A | | 5/1972 | Wilson | |
|---|---|---|---|---|---|
| 4,117,465 | A | * | 9/1978 | Timblin | E05G 1/10 200/61.93 |
| 4,823,570 | A | | 4/1989 | Jurek | |
| 6,102,394 | A | | 8/2000 | Wurz et al. | |
| 2008/0113708 | A1 | | 5/2008 | Beadell et al. | |
| 2008/0113740 | A1 | * | 5/2008 | McGahn | G07F 17/32 463/20 |

OTHER PUBLICATIONS

Photo of switch, Bally Twin Star, photo taken on Jul. 30, 2018, 1 page.

* cited by examiner

*Primary Examiner* — Werner G Garner
(74) *Attorney, Agent, or Firm* — Wolf IP Law PLLC; Dean E. Wolf, Esq.

(57) ABSTRACT

Various aspects described or referenced herein are directed to different methods and systems for facilitating secure access to various components of electronic wager-based gaming devices such as video slot machines, video poker machines, and other types of wager-based gaming machines. One aspect disclosed herein is directed to an improved button panel assembly design which enables a button panel to be attached/detached to/from the gaming machine cabinet in a manner which does not require the opening of the main access door, and in a manner which does not require access to the interior of the gaming machine cabinet. Another aspect is directed to an improved button panel security system.

12 Claims, 12 Drawing Sheets

BUTTON PANEL ASSEMBLY AND SECURITY SYSTEM FOR A GAMING DEVICE

TECHNICAL FIELD

The present disclosure relates generally to gaming devices, such as electronic wager-based gaming devices. More particularly, the present disclosure relates to apparatus and methods for facilitating secure access to, and servicing of, electronic gaming devices.

BACKGROUND

Gaming in the United States is divided into Class I, Class II and Class III games. Class I gaming includes social games played for minimal prizes, or traditional ceremonial games. Class II gaming includes bingo games, pull tab games, lotto, keno, and other similar games. Class III gaming includes any game that is not a Class I or Class II game, such as a game of chance typically offered in non-Indian, state-regulated casinos. Many games of chance that are played on wager-based gaming devices fall into the Class II and Class III categories of games.

Electronic gaming devices such as video slot machines and video poker machines are becoming increasingly popular. Part of the reason for their increased popularity is the nearly endless variety of games that can be made available for play on a single gaming device. Advancements in video and electronic gaming enable the operation of more complex games that would not otherwise be possible on mechanical-driven gaming devices or personal computers. For reference purposes, electronic wager-based gaming devices may be referred to as "EGDs" ("EGD" in singular form) or electronic gaming machines (EGMs).

Various games, particularly the Class II and Class III categories of games, can be implemented as server-based games in a server-client system. In a server-based gaming arrangement, a gaming server serves multiple gaming devices as clients. For example, a casino can include a plurality of EGDs located on the game floor, and a connected gaming server located in a back room of the casino. Generally, the games and capabilities of and EGD depend on the central server. Games can be downloaded from the central server to the EGDs for execution, for instance, when initiated by casino operations management. Alternatively, the central server can execute the games and output game data to the EGDs.

To enhance the gaming experience, there are a number of peripheral components/devices that can be connected to EGDs. Examples of these devices include player tracking units, lights, ticket printers, card readers, speakers, bill acceptors/validators, ticket readers, coin acceptors, display panels, key pads, coin hoppers and button pads. These peripheral devices are built into the EGD or otherwise attached to the EGD.

In the heavily regulated field of wager-based gaming, EGDs and their associated peripheral devices are required to be compliant with current wager-based gaming regulatory standards such as, for example, the well-known GLI standards, which have already been approved in various gaming jurisdictions. One example of a GLI standard is the GLI-11 standard version 3.0, Published Sep. 21, 2016 by Gaming Laboratories International, LLC, the entirety of which is herein incorporated by reference for all purposes.

One important consideration for casino operators relates to the ability of EGD service technicians to quickly access EGDs deployed in "the field" (e.g., EGDs deployed on a casino floor) while also maintaining proper levels of security. For example, if a component of an EGD needs to be inspected, serviced, and/or tested, a service technician may be dispatched to the EGD's location in order to perform the desired service/testing/inspection in the field.

In many situations, the servicing or inspection of an EGD button panel (and/or its components) may require removal or detachment of the button panel from the gaming machine cabinet. However, in many of today's EGD designs, the removal or detachment of the button panel can only be achieved via access the interior of the gaming machine cabinet. One reason for designing EGDs in this manner is that it provides some perceived security benefits. For example, access to the interior of a gaming machine cabinet is typically controlled via the opening/closing of a main access door, and most EGD typically include a variety of security mechanisms to monitor, detect, and track when the main access door has been opened/closed, and (in some cases) by whom. Accordingly, the removal or detachment of the button panel may be viewed as being more securely controlled by designing the EGD such that its button panel can only be removed or detached via access the interior of the gaming machine cabinet.

However, such conventional EGD designs may also be disadvantageous for a number of reasons. For example, if a service technician is required to open the main access door to obtain access to the interior of the gaming machine cabinet in order to remove or detach the button panel, this situation may introduce an additional security risks since, for example, the opening of the main access door also provides access to other components within the interior of the gaming machine cabinet, which may subsequently be tampered with while the main access door is in its open position. Additionally, in many conventional EGD designs, the removal or detachment of the button panel from the EGD may involve a relatively time consuming process. Further, because many EGDs are configured or designed to utilize various types of mechanical fasteners (e.g., screws, bolts, nuts, etc.) for assembling together the various components of an EGD, EGD service technicians are typically required to utilize a variety of different types of hand tools (e.g., screwdrivers, socket wrenches, crescent wrenches, pliers, etc.) in order to remove (and then re-install) specific fasteners during the process of accessing specific components of the EGD. Significant delays may be introduced during this process if the service technician does not have the proper tools and/or loses or misplaces one or more of the fasteners. Accordingly, one object of the present disclosure is to provide an improved EGD button panel assembly design which overcomes at least some of the disadvantageous features of existing EGD designs.

Another issue concerning EGD button panel access relates to security. For example, in wager-based gaming environments such as casinos, it is important that EGD designs provide adequate security mechanisms to detect and prevent unauthorized access to the gaming device components, including the EGD button panel components. Some currently existing EGD designs, such as the Orion Slant (sold by AGS LLC of Las Vegas, Nev.), utilize an access panel and intrusion detection switch to provide and maintain secure access to the button deck. In the Orion Slant EGD design, the button panel intrusion detection switch is mounted to a button panel frame assembly which is used to securely attach the button panel to the EGD gaming cabinet. The intrusion switch includes a plunger mechanism which directly engages with a removable access panel that is used to control access to the internal or interior components of the button panel. Thus, for example, when the access panel is in a secure and closed configuration, the surface of the access panel directly engages with the plunger mechanism of the intrusion switch. Alternatively, when the access panel is removed, the access panel does not engage with the switch's plunger mechanism, thereby causing a "non-secure" or "intrusion" condition to occur. In other EGD designs such as the Twinstar EGD (sold by Scientific Games Corporation of Las Vegas, Nev.) an access panel is used to provide secure access the button deck. The access panel is held on by phillips screws, and is interlocked by an EGD belly door so that the access panel cannot be removed unless the belly door is opened to obtain access to the interior of the EGD.

These types of EGD security features and designs may introduce a variety of undesirable aspects. For example, in EGD designs where the intrusion detection switch is mounted to the button panel frame assembly (e.g., which is located at the exterior of the gaming cabinet housing), the intrusion detection switch is more susceptible to tampering and unauthorized access. Additionally, in such EGD designs, in order to remove or detach the button panel frame assembly from the gaming cabinet, power to the intrusion detection switch would need to be disconnected. Accordingly, another object of the present disclosure is to provide an improved button panel security system which overcomes at least some of the disadvantageous features of existing EGD designs.

BRIEF DESCRIPTION OF THE DRAWINGS

The included drawings are for illustrative purposes and serve only to provide examples of possible structures and arrangements for the disclosed inventive apparatuses, systems and methods for EGDs having improved accommodations for limited mobility players. These drawings in no way limit any changes in form and detail that may be made to the disclosure by one skilled in the art without departing from the spirit and scope of the disclosure.

DETAILED DESCRIPTION OF EXAMPLE EMBODIMENTS

Overview

Figure 1:
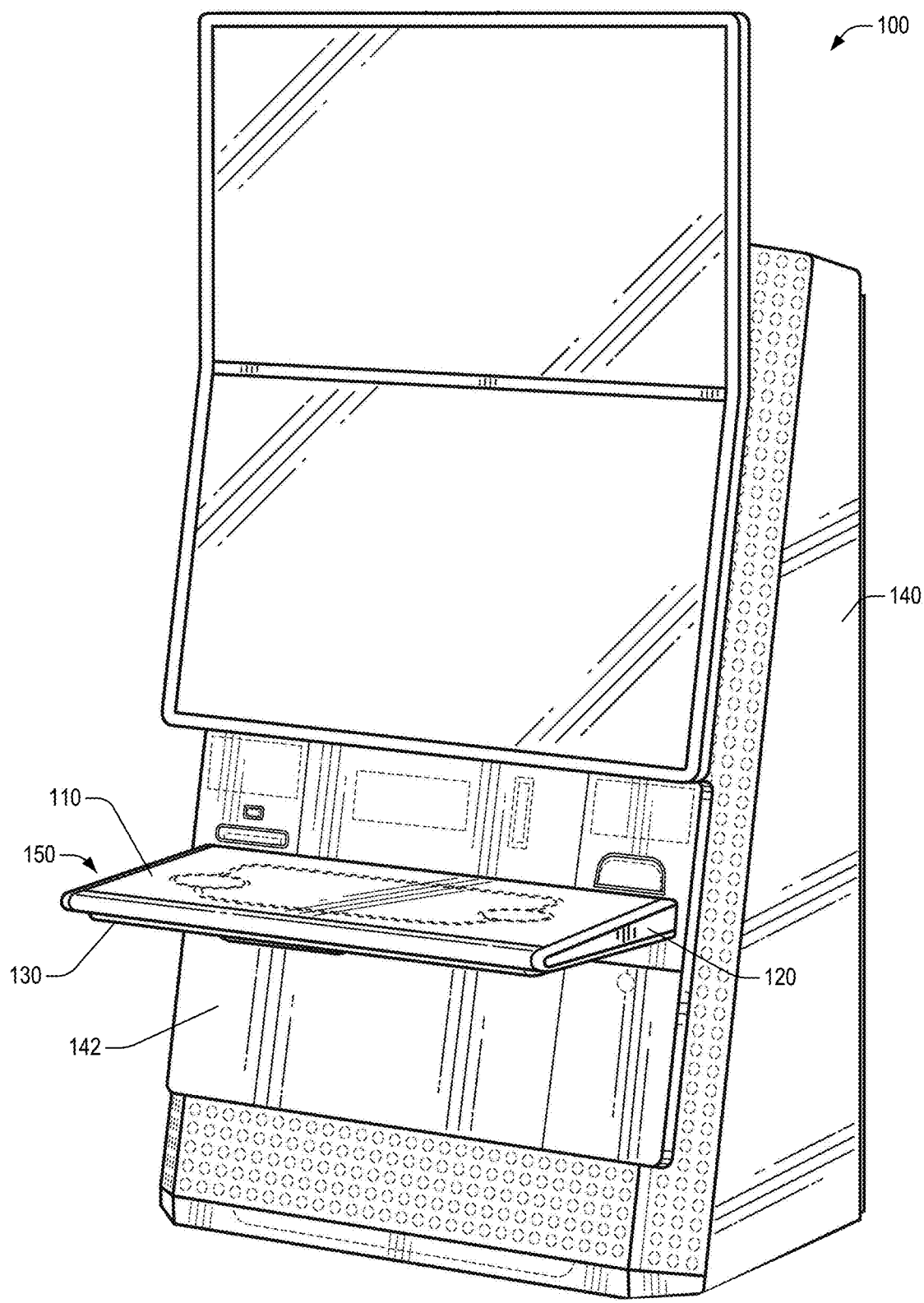
FIG. 1 illustrated a front perspective view of an electronic gaming device ("EGD") 100 according to one embodiment.

Various aspects described or referenced herein are directed to different methods and systems for facilitating secure access to various components of electronic wager-based gaming devices such as video slot machines, video poker machines, and other types of wager-based gaming machines.

One aspect of the present disclosure is directed to an improved EGD button panel assembly design in which the button panel may be securely and removably attached/detached to/from the gaming machine cabinet in a manner which does not require the opening of the main access door, and in a manner which does not require access to the interior of the gaming machine cabinet.

Another aspect of the present disclosure is directed to an improved EGD button panel assembly design which employs the use of non-removable mechanical fasteners for enabling the EGD button panel to be securely and removably attached/detached to/from the gaming machine cabinet without requiring the removal of mechanical fasteners.

Yet another aspect of the present disclosure is directed to an improved EGD button panel assembly design which employs the use of non-removable mechanical fasteners for enabling the EGD button panel to be securely and removably attached/detached to/from the gaming machine cabinet by a human technician, and without requiring the use of hardware tools such as screwdrivers, wrenches, pliers, etc.

A further aspect of the present disclosure is directed to an improved button panel assembly security design which is configured or designed to allow the button panel assembly (and/or selected components thereof) to be removably attached/detached to/from the gaming machine cabinet without disrupting power to the EGD's button panel intrusion sensor(s)/switch(s), and without providing access to the interior of the gaming cabinet (whose access is generally highly regulated so as to prevent unauthorized access and/or tampering of the EGD's internal components).

An additional aspect of the present disclosure is directed to an improved button panel assembly security design in which the button panel intrusion detection switch is operably mounted within the interior of the gaming cabinet while still being able to continuously monitor and detect intrusions and/or other access events relating to the button panel and/or its components. In at least one embodiment, this may be effected via the use of an intrusion lever component deployed within the button panel assembly and configured or designed to engage or disengage with the button panel intrusion detection switch in response to the opening/closing of button panel assembly access panel.

Various system(s) and/or method(s) are described herein which relate to at least one gaming machine embodiment comprising: a cabinet including an entry that provides access to an interior of the cabinet; a button panel assembly extending from a front portion of the cabinet, the button panel assembly being removably attached to the cabinet, the button panel assembly including a button panel comprising at least one interface for receiving player input; the button panel assembly being configured or designed to enable the button panel to be detached from the button panel assembly in a manner which does not require access to the interior of the cabinet; and the button panel assembly being configured or designed to enable the button panel to be securely attached to the button panel assembly in a manner which does not require access to the interior of the cabinet.

In at least some embodiments, the button panel assembly further comprises a button panel support frame assembly, the button panel support frame assembly including a first set of fastener components attached thereto; the button panel includes a second set of fastener components attached thereto; the button panel assembly being configured or designed to enable the button panel to be securely attached to the button panel support frame assembly via engagement of the first set of fastener components with the second set of fastener components in a manner which does not require the first set of fastener components to be detached or separated from the button panel support frame assembly, and in a manner which does not require the second set of fastener components to be detached or separated from the button panel; and the button panel assembly being further configured or designed to enable the button panel to be detached the button panel support frame assembly via disengagement of the first set of fastener components from the second set of fastener components in a manner which does not require the first set of fastener components to be detached or separated from the button panel support frame assembly, and in a manner which does not require the second set of fastener components to be detached or separated from the button panel.

In at least some embodiments, the button panel assembly further comprises a button panel support frame assembly; the button panel assembly and button panel being configured or designed to enable the button panel to be detached from the button panel support frame assembly in a manner which does not require access to the interior of the cabinet; and the button panel assembly and button panel being further configured or designed to enable the button panel to be securely attached to the button panel support frame assembly in a manner which does not require access to the interior of the cabinet In at least some embodiments, the button panel support frame assembly includes a first set of fastener components attached thereto; wherein the button panel includes a second set of fastener components attached thereto; the button panel assembly being configured or designed to enable the button panel to be securely attached to the button panel support frame assembly via engagement of the first set of fastener components with the second set of fastener components in a manner which does not require the first set of fastener components to be detached or separated from the button panel support frame assembly, and in a manner which does not require the second set of fastener components to be detached or separated from the button panel; and the button panel assembly being further configured or designed to enable the button panel to be detached the button panel support frame assembly via disengagement of the first set of fastener components from the second set of fastener components in a manner which does not require the first set of fastener components to be detached or separated from the button panel support frame assembly, and in a manner which does not require the second set of fastener components to be detached or separated from the button panel.

In at least some embodiments, the button panel assembly further comprises a button panel support frame assembly, the button panel support frame assembly including a first set of fastener components attached thereto; wherein the button panel includes a first set of captive, quarter-turn fasteners attached thereto; the button panel assembly being configured or designed to enable the button panel to be securely attached to the button panel support frame assembly via engagement of the first set of captive, quarter-turn fasteners with the first set of fastener components in a manner which does not require the first set of fastener components to be detached or separated from the button panel support frame assembly, and in a manner which does not require the first set of captive, quarter-turn fasteners to be detached or separated from the button panel; and the button panel assembly being further configured or designed to enable the button panel to be detached the button panel support frame assembly via disengagement of the first set of captive, quarter-turn fasteners from the first set of fastener components in a manner which does not require the first set of fastener components to be detached or separated from the button panel support frame assembly, and in a manner which does not require the first set of captive, quarter-turn fasteners to be detached or separated from the button panel.

In at least some embodiments, the button panel assembly further comprises an access panel assembly; wherein the button panel assembly further comprises a button panel support frame assembly; the button panel support frame assembly including a first set of fastener components attached thereto; wherein the button panel includes a second set of fastener components attached thereto; the button panel assembly being configured or designed to enable the button panel to be securely attached to the button panel support frame assembly via engagement of the first set of fastener components with the second set of fastener components in a manner which does not require the first set of fastener components to be detached or separated from the button panel support frame assembly, and in a manner which does not require the second set of fastener components to be detached or separated from the button panel; the button panel assembly being further configured or designed to enable the button panel to be detached the button panel support frame assembly via disengagement of the first set of fastener components from the second set of fastener components in a manner which does not require the first set of fastener components to be detached or separated from the button panel support frame assembly, and in a manner which does not require the second set of fastener components to be detached or separated from the button panel; and the access panel assembly being configured or designed to removably attach to the button panel support frame assembly in a manner which controls access to the second set of fastener components.

In at least some embodiments, the button panel assembly further comprises an access panel assembly configured or designed to control access to internal components of the button panel assembly; wherein the button panel assembly further comprises a button panel support frame assembly; the button panel support frame assembly including a first set of fastener components attached thereto; wherein the button panel includes a second set of fastener components attached thereto; the button panel assembly being configured or designed to enable the button panel to be securely attached to the button panel support frame assembly via engagement of the first set of fastener components with the second set of fastener components in a manner which does not require the first set of fastener components to be detached or separated from the button panel support frame assembly, and in a manner which does not require the second set of fastener components to be detached or separated from the button panel; the button panel assembly being further configured or designed to enable the button panel to be detached the button panel support frame assembly via disengagement of the first set of fastener components from the second set of fastener components in a manner which does not require the first set of fastener components to be detached or separated from the button panel support frame assembly, and in a manner which does not require the second set of fastener components to be detached or separated from the button panel; the access panel assembly being configured or designed to attach to the button panel support frame assembly in a manner which prevents access to the second set of fastener components; and the access panel assembly being further configured or designed to detach from the button panel support frame assembly in a manner which enables access to the second set of fastener components.

Additional system(s) and/or method(s) are described herein which relate to a at least one gaming machine embodiment comprising: a cabinet including an entry that provides access to an interior of the cabinet; a security system comprising an electro-mechanical button panel intrusion switch mounted at the interior of the cabinet, the button panel intrusion switch including a first electrical interface for receiving electrical power; a button panel assembly extending from a front portion of the cabinet, the button panel assembly being removably attached to the cabinet; the button panel assembly including a button panel comprising at least one interface for receiving player input; the button panel assembly further comprising an access panel assembly configured or designed to control access to internal components of the button panel assembly; the access panel assembly including a security plate; the access panel assembly being configured or designed to securely attach to the button panel assembly in a manner which prevents access to the internal components of the button panel assembly; the access panel assembly being further configured or designed to detach from the button panel assembly in a manner which enables access to the internal components of the button panel assembly; the gaming machine being configured or designed in a manner such that, while the access panel assembly is securely attached to the button panel assembly, the button panel intrusion switch is caused to be configured according to a first position; and the gaming machine being further configured or designed in a manner such that, while the access panel assembly is detached from the button panel assembly, the button panel intrusion switch is caused to be configured according to a second position different from the first position.

In at least some embodiments, the gaming machine may be further configured or designed to enable the button panel assembly to be detached from the cabinet without disrupting electrical power supplied to the button panel intrusion switch. In at least some embodiments, the gaming machine may be further configured or designed to enable the button panel to be detached from the button panel assembly without disrupting electrical power supplied to the button panel intrusion switch.

In at least some embodiments, the gaming machine further comprises an intrusion lever pivotably mounted to the button panel assembly, the intrusion lever including a first end portion disposed within an interior of the button panel assembly, the intrusion lever further including a second end portion disposed within the interior of the cabinet; the gaming machine being configured or designed in a manner such that, while the access panel assembly is securely attached to the button panel assembly, the intrusion lever causes the button panel intrusion switch to be configured according to a first configuration; and the gaming machine being further configured or designed in a manner such that, while the access panel assembly is detached from to the button panel assembly, the intrusion lever causes the button panel intrusion switch to be configured according to a second configuration different from the first configuration.

In at least some embodiments, the gaming machine further comprises an intrusion lever pivotably mounted to the button panel assembly, the intrusion lever including a first end portion disposed within an interior of the button panel assembly, the intrusion lever further including a second end portion disposed within the interior of the cabinet; wherein the button panel intrusion switch is configured or designed as a plunger-type switch which includes a plunger component; the gaming machine being configured or designed in a manner such that, while the access panel assembly is securely attached to the button panel assembly, the intrusion lever causes the plunger component to remain in a first position representing a "closed" or "retracted" configuration; and the gaming machine being further configured or designed in a manner such that, while the access panel assembly is detached from to the button panel assembly, the intrusion lever causes the plunger component of button panel intrusion switch to remain in a second position representing an "opened" or "extended" configuration. For example, in at least one embodiment, when the access panel is removed from the button panel assembly, this causes the intrusion lever to move so as to cause the intrusion switch to be in an "opened" configuration. When the EGD detects that the intrusion switch is opened, the EGD shows an error on the display, and goes to a non-playable state until the switch is detected as being closed. In at least one embodiment, when the access panel is attached the button panel assembly, this causes intrusion lever to move so as to cause the intrusion switch to be in a "closed" configuration.

In at least some embodiments, the gaming machine further comprises an intrusion lever pivotably mounted to the button panel assembly, the intrusion lever including a first body portion disposed within an interior of the button panel assembly, the intrusion lever further including a second body portion disposed within the interior of the cabinet; wherein the button panel intrusion switch is configured or designed as a plunger-type switch which includes a plunger component; the gaming machine being configured or designed in a manner such that, while the access panel assembly is securely attached to the button panel assembly, a portion of the security plate is caused to engage with the first body portion of the intrusion lever in a manner which causes the second body portion of the intrusion lever to engage with the plunger component in a manner which causes the plunger component to remain in a first position representing a retracted configuration; and the gaming machine being configured or designed in a manner such that, while the access panel assembly is detached from the button panel assembly, the second body portion of the intrusion lever enables the plunger component to remain in a second position representing an extended configuration.

Additional system(s) and/or method(s) are described herein which relate to a at least one gaming machine embodiment comprising: a cabinet including an entry that provides access to an interior of the cabinet; a button panel assembly disposed at an exterior portion of the cabinet, the button panel assembly being removably attachable to the cabinet; the button panel assembly including a button panel support frame assembly, the button panel support frame assembly including a first set of fastener components attached thereto; the button panel assembly further including a button panel comprising at least one interface for receiving player input, the button panel further comprising a second set of fastener components attached thereto; the button panel being attachable to the button panel support frame assembly via engagement of the first set of fastener components with the second set of fastener components; the button panel further being attachable to the button panel support frame assembly in a manner which does not require access to the interior of the cabinet; the button panel being detachable from the button panel support frame assembly via disengagement of the first set of fastener components from the second set of fastener components; and the button panel further being detachable from the button panel support frame assembly in a manner which does not require access to the interior of the cabinet.

In at least some embodiments, the button panel is attachable to the button panel support frame assembly via engagement of the first set of fastener components with the second set of fastener components in a manner which does not require the first set of fastener components to be detached or separated from the button panel support frame assembly, and in a manner which does not require the second set of fastener components to be detached or separated from the button panel. In at least some embodiments, the button panel is detachable from the button panel support frame assembly via disengagement of the first set of fastener components from the second set of fastener components in a manner which does not require the first set of fastener components to be detached or separated from the button panel support frame assembly, and in a manner which does not require the second set of fastener components to be detached or separated from the button panel.

In at least some embodiments, the second set of fastener components includes a set of captive, quarter-turn fasteners; the button panel is attachable to the button panel support frame assembly via engagement of the set of captive, quarter-turn fasteners with the first set of fastener components in manner which does not require the first set of captive, quarter-turn fasteners to be detached or separated from the button panel; and the button panel is detachable from the button panel support frame assembly via disengagement of the first set of captive, quarter-turn fasteners from the first set of fastener components in a manner which does not require the first set of captive, quarter-turn fasteners to be detached or separated from the button panel.

In at least some embodiments, the button panel assembly further comprises an access panel assembly; the access panel assembly being removably attachable to the button panel support frame assembly in a manner which controls access to the second set of fastener components; the button panel support frame assembly including a first set of connector components; the access panel assembly including a second set of connector components; the access panel assembly being attachable to the button panel support frame assembly via engagement of the first set of connector components with the second set of connector components; the access panel assembly being detachable from the button panel support frame assembly via disengagement of the first set of connector components from the second set of connector components; the access panel assembly being attachable to the button panel support frame assembly in a manner which prevents access to the second set of fastener components; and the access panel assembly being detachable from the button panel support frame assembly in a manner which enables access to the second set of fastener components.

Additional system(s) and/or method(s) are described herein which relate to a at least one gaming machine embodiment comprising: a cabinet including an entry that provides access to an interior of the cabinet; a button panel assembly disposed at an exterior portion of the cabinet, the button panel assembly being removably attachable to the cabinet; the button panel assembly including a button panel support frame assembly; the button panel assembly including a button panel comprising at least one interface for receiving player input; attachment means for attaching the button panel to the button panel support frame assembly in a manner which does not require access to the interior of the cabinet; and detachment means for detaching the button panel from the button panel support frame assembly in a manner which does not require access to the interior of the cabinet.

In at least some embodiments, the button panel assembly further comprises an access panel assembly, and the gaming machine further comprises: means for attaching the access panel assembly to the button panel support frame assembly in a manner which prevents access to the attachment means and detachment means; and means for detaching the access panel assembly from the button panel support frame assembly in a manner which provides access to the attachment means and detachment means.

Additional system(s) and/or method(s) are described herein which relate to a at least one gaming machine embodiment comprising: a cabinet including an entry that provides access to an interior of the cabinet; a button panel assembly disposed at an exterior portion of the cabinet, the button panel assembly being removably attachable to the cabinet; an electro-mechanical button panel intrusion switch disposed at the interior of the cabinet, the button panel intrusion switch including a first electrical interface for receiving electrical power; the button panel assembly including a button panel support frame assembly; the button panel assembly further including a button panel comprising at least one interface for receiving player input, the button panel being removably attachable to the button panel support frame assembly; and the button panel assembly further including an intrusion lever pivotably mounted to the button panel support frame assembly, the intrusion lever including a first end portion disposed within the button panel assembly, the intrusion lever further including a second end portion disposed within the interior of the cabinet, the second end portion being positioned for engagement with the button panel intrusion switch.

In some embodiments, the button panel intrusion switch corresponds to plunger-type switch which includes a movable plunger component for controlling a state of the intrusion switch such that when the plunger component is in a retracted position, the state of the intrusion switch is caused to be in a closed state, and when the plunger component is in an extended position, the state of the intrusion switch is caused to be in an open state; wherein the button panel assembly further comprises an access panel, the access panel being removably attachable to the button panel support frame assembly in a manner which controls access to internal components of the button panel assembly; and wherein the first end portion of the intrusion lever is positioned to detachably engage with a portion of the access panel such that, while the intrusion lever is engaged with the portion of the access panel, the intrusion lever causes the plunger component of the intrusion switch to be in the retracted position, and while the intrusion lever is not engaged with the portion of the access panel, the intrusion lever causes the plunger component of the intrusion switch to be in the extended position.

In some embodiments, the button panel is detachable from the button panel support frame assembly without causing disruption of electrical power supplied to the intrusion switch; and the button panel is attachable to the button panel support frame assembly without causing disruption of electrical power supplied to the intrusion switch. In some embodiments, the button panel is attachable to the button panel support frame assembly in a manner which does not require access to the interior of the cabinet; and the button panel is detachable from the button panel support frame assembly in a manner which does not require access to the interior of the cabinet.

In some embodiments, the button panel intrusion switch corresponds to plunger-type switch which includes a movable plunger component for controlling a state of the intrusion switch such that when the plunger component is in a retracted position, the state of the intrusion switch is caused to be in a closed state, and when the plunger component is in an extended position, the state of the intrusion switch is caused to be in an open state; wherein the button panel is removably attachable to the button panel support frame assembly via a first plurality of fasteners; and wherein access to the first plurality of fasteners causes the intrusion lever to engage with the intrusion switch in a manner which causes the intrusion switch to be in an open state.

Additional system(s) and/or method(s) are described herein which relate to a at least one gaming machine embodiment comprising: a cabinet including an entry that provides access to an interior of the cabinet; a button panel assembly disposed at an exterior portion of the cabinet, the button panel assembly being removably attachable to the cabinet; the button panel assembly including a button panel support frame assembly; the button panel assembly further including a button panel comprising at least one interface for receiving player input, the button panel being removably attachable to the button panel support frame assembly; and button panel assembly security means for monitoring security conditions relating to the button panel assembly, the button panel assembly means including intrusion switch means disposed at the interior of the cabinet, the intrusion detection means further including intrusion detection means disposed at the button panel assembly; wherein the intrusion switch means is switchable between at least two states, including an open state and a closed state; wherein intrusion detection means includes first means for causing intrusion switch means to be in the closed state in response to the button panel assembly being in a secure state; and wherein intrusion detection means includes second means for causing the intrusion switch means to be in the open state in response to at least one component of the button panel assembly being in a non-secure state.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Although these embodiments are described in sufficient detail to enable one skilled in the art to practice the disclosure, it is understood that these examples are not limiting, such that other embodiments may be used, and changes may be made without departing from the spirit and scope of the disclosure.

Turning first to FIG. 1, an EGD 100 according to one embodiment of the present disclosure is illustrated in front perspective view. In various embodiments, methods of game play and presentation can be implemented via an EGD or device 100. Such an EGD 100 may have various configurations, and again may facilitate the play of wager-based games or other games that are not wager-based. The EGD 100 may be located at a casino or other gaming establishment. The EGD 100 may be part of a gaming system, such as a casino gaming system which links multiples of the EGDs, one or more table games, and/or other devices such as kiosks, accounting systems, progressive systems, player tracking systems, respective servers thereof, and the like.

As illustrated, EGD 100 generally comprises a physical housing or cabinet 140 for supporting and/or enclosing various components required for operation of the EGD. Housing 140 can include a main access door (e.g., 142), the door capable of being moved between an open position that allows access to the interior of the gaming cabinet, and a closed position where access to the interior is generally prevented. Configurations of the EGD 100 may vary. Although EGD 100 has an "upright" configuration as shown, alternative configurations, shapes, or dimensions can include a "slant" type, "bar-top" type, "cocktail table" type, and/or other configurations, as are well known to those of skilled in the art.

In various embodiments, EGD 100 can be configured to present one or more wager-based games upon a player making a monetary payment or wager. In this regard, EGD 100 can include means for accepting monetary value or coin in. In various embodiments, certain game outcomes may be designated as winning outcomes. Prizes or awards may be provided for winning outcomes, such as monetary payments (or representations thereof, such as prize of credits), or promotional awards. The EGD 100 can also include mean for returning unused monetary funds and/or dispensing winnings to a player, such as by way of physical coins, printed tickets, cash vouchers, electronically stored credits to player accounts, and the like. In some embodiments, the EGD 100 may include a coin acceptor and a coin tray.

In the specific example embodiment of FIG. 1, EGD 100 includes a main cabinet 140, which generally surrounds the machine interior and is viewable by users. Mounted to the cabinet is a button panel assembly 150 which extends outward from the front of the cabinet. As illustrated in the example embodiment of FIG. 1, the button panel assembly 150 includes, for example:

Button panel 110, which for example, may be configured or designed to include one or more player-input switches, touch screens, or buttons and/or other input devices for a player to play games on the EGD 100, such as, for example, place bets, and otherwise interact with the machine to play a game;

Button panel support frame 120 (e.g., including side rails and front bumper); and Button panel access assembly 130.

In the specific example embodiment of FIG. 1, EGD 100 is also configured or designed to include a plurality of video displays such as a high-resolution, flat-panel liquid crystal displays (LCD), which, for example, may be configured or designed to display game play content and/or information relating to various aspects of wager-based game play and/or other content. In at least some embodiments, the EGD 100 may also include a player tracking module. In one embodiment, the player tracking module may include a key pad for entering player tracking information, a display for displaying player tracking information, and a card reader or RFID reader for entering a magnetic striped card or RFID card containing player tracking information. In at least some embodiments, EGM 100 also includes a bill validator and ticket printer, which are both securely disposed within the interior of EGM cabinet.

In at least some embodiments, the EGM may include one or more interfaces configured or designed to provide player tracking services and other game services to a player playing a game on the EGD 100. For example, in one embodiment, one or more EGM interfaces may be configured or designed to facilitate, enable, initiate, and/or perform one or more of the following: 1) input player tracking identification information, 2) view account information and perform account transactions for accounts such as player tracking accounts and bank accounts, 3) receive operating instructions, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms, 9) play games and bonus games, 10) request gaming services such as drink orders, 11) communicate with other players or casino service personnel and 12) register a player for a loyalty program such as a player tracking program. In addition, in at least some embodiments, one or more EGM interfaces may be used by casino service personnel to: a) access diagnostic menus, b) display player tracking unit status information and EGD status information, c) access EGD metering information and d) display player status information.

Many different types of games, including mechanical slot games, video slot games, video poker, video blackjack, video pachinko and lottery, may be provided on EGD 100. The EGD 100 is operable to provide play of many different instances of games of chance. The instances may be differentiated according to themes, sounds, graphics, type of game (e.g., slot game vs. card game), denomination, number of paylines, maximum jackpot, progressive or non-progressive, bonus games, etc. The EGD 100 may be operable to allow a player to select a game of chance to play from a plurality of instances available on the EGD. For example, the EGD may provide a menu with a list of the instances of games that are available for play on the EGD and a player may be able to select from the list a first instance of a game of chance that they wish to play.

The various instances of games available for play on the EGD 100 may be stored as game software on a mass storage device in the EGD or may be generated on a remote EGD but then displayed on the EGD. The EGD 100 may execute game software, such as but not limited to video streaming software that allows the game to be displayed on the EGD. When an instance is stored on the EGD 100, it may be loaded from the mass storage device into a RAM for execution. In some cases, after a selection of an instance, the game software that allows the selected instance to be generated may be downloaded from a remote EGD, such as another EGD.

Understand that EGD 100 is but one example from a wide range of EGDs on which the present invention may be implemented. Also, a game may be generated on a host computer and may be displayed on a remote terminal or a remote EGD. The remote EGD may be connected to the host computer via a network of some type such as a local area network, a wide area network, an intranet or the Internet, by a wired or wireless connection. The remote EGD may be a portable EGD such as but not limited to a cell phone, a personal digital assistant, and a wireless game player. Images rendered from 3-D gaming environments may be displayed on portable EGDs that are used to play a game of chance. Further, an EGD or server may include gaming logic for commanding a remote EGD to render an image from a virtual camera in a 3-D gaming environment stored on the remote EGD and to display the rendered image on a display located on the remote EGD. Thus, those skilled in the relevant art will understand that the present invention, as described below, can be deployed on most any EGD now available or hereafter developed.

Some EGDs are implemented with special features and/or additional circuitry that differentiates them from general-purpose computers (e.g., desktop personal computers and laptops). EGDs are highly regulated to ensure fairness and, in many cases, EGDs are operable to dispense monetary awards of multiple millions of dollars. Therefore, to satisfy security and regulatory requirements in a gaming environment, hardware and software architectures may be implemented in EGDs that differ significantly from those of general-purpose computers. A description of EGDs relative to general-purpose computing machines and some examples of the additional (or different) components and features found in EGDs are described below.

At first glance, one might think that adapting PC technologies to the gaming industry would be a simple proposition because both PCs and EGDs employ microprocessors that control a variety of devices. However, because of such reasons as 1) the regulatory requirements that are placed upon EGDs, 2) the harsh environment in which EGDs operate, 3) security requirements, and 4) fault tolerance requirements, adapting PC technologies to an EGD can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in an EGD because in an EGD these faults can lead to a direct loss of funds from the EGD, such as stolen cash or loss of revenue when the EGD is not operating properly.

For the purposes of illustration, a few differences between PC systems and gaming systems will be described. A first difference between EGDs and common PC based computers systems is that EGDs are designed to be state-based systems. In a state-based system, the system stores and maintains its current state in a non-volatile memory, such that, in the event of a power failure or other malfunction the EGD will return to its current state when the power is restored. For instance, if a player was shown an award for a game of chance and, before the award could be provided to the player the power failed, the EGD, upon the restoration of power, would return to the state where the award is indicated. This requirement affects the software and hardware design on an EGD. As anyone who has used a PC knows, PCs are not state machines and a majority of data is usually lost when such a malfunction occurs.

A second important difference between EGDs and common PC based computer systems relates to security features. For example, in the heavily regulated field of wager-based gaming, EGDs and their associated peripheral devices are required to be compliant with rigorous wager-based gaming regulatory standards. Such gaming regulatory standards often include detailed provisions specifying security standards which must be satisfied and/or maintained with respect to the EGD and its components, particularly those components located at the interior of the EGD, such as, for example, processors, memory, ticket dispensers, bill validators, and the like. In order for gaming manufacturers to comply with such security standards, it is important that their EGD design(s) provide adequate security mechanisms to monitor and control authorized access to the EGD's components, particularly the components located at the interior of the EGD. Additionally, it is important that their EGD design(s) provide adequate security mechanisms to detect and prevent unauthorized access to (and prevent tampering with) the EGD's components, particularly the components located at the interior of the EGD.

Another important difference between EGDs and common PC based computer systems is that for regulation purposes, the software on the EGD used to generate the game of chance and operate the EGD has been designed to be static and monolithic to prevent cheating by the operator of the EGD. For instance, one solution that has been employed in the gaming industry to prevent cheating and satisfy regulatory requirements has been to manufacture an EGD that can use a proprietary processor miming instructions to generate the game of chance from an EPROM or other form of nonvolatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burned, approved by the gaming jurisdiction and installed on the EGD in the presence of a gaming regulator. Regardless of whether the EPROM solution is used, to gain approval in most gaming jurisdictions, an EGD must demonstrate sufficient safeguards that prevent an operator or player of an EGD from manipulating hardware and software in a manner that gives them an unfair and in some cases an illegal advantage. The EGD should have a means to determine if the code it will execute is valid. If the code is not valid, the EGD must have a means to prevent the code from being executed. The code validation requirements in the gaming industry affect both hardware and software designs on EGDs.

A third important difference between EGDs and common PC based computer systems is that the number and kinds of peripheral devices used on an EGD are not as great as on PC based computer systems. Traditionally, in the gaming industry, EGDs have been relatively simple in the sense that the number of peripheral devices and the number of functions of the EGD have been limited. Further, in operation, the functionality of EGDs were relatively constant once the EGD was deployed, i.e., new peripherals devices and new gaming software were infrequently added to the EGD. This differs from a PC where users will buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on an EGD, EGDs still have unique device requirements that differ from a PC, such as device security requirements not usually addressed by PCs. For instance, monetary devices, such as coin dispensers, bill validators, ticket printers and computing devices that are used to govern the input and output of cash to an EGD have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in EGDs that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory. Additionally, at least some EGM embodiments may be configured or designed to include unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

In at least some embodiments, the serial interfaces may be used to transmit information using communication protocols that are unique to the gaming industry. For example, SAS is a communication protocol used to transmit information, such as metering information, from an EGD to a remote device. Often SAS is used in conjunction with a player tracking system.

In at least some embodiments, the EGM may be treated as peripheral devices to a casino communication controller and connected in a shared daisy chain fashion to a single serial interface. The peripheral devices may preferably be assigned device addresses. In some embodiments, the serial controller circuitry may be configured or designed to implement a method to generate or detect unique device addresses. General-purpose computer serial ports are not able to do this.

The EGM may also include switch based security monitoring circuits and other security monitoring circuits configured or designed to detect intrusion into the EGD by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the EGD can determine whether any security violations occurred while power was off, e.g., via software for reading status registers. This can trigger event log entries and further data authentication operations by the slot machine software.

Trusted memory devices are preferably included as part of the EGM hardware to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the EGD is allowed to verify the authenticity of additional code and data that may be located in the gaming computer assembly, such as code and data stored on hard disk drives.

Mass storage devices used in a general purpose computer typically allow code and data to be read from and written to the mass storage device. In an EGD environment, modification of the gaming code stored on a mass storage device is strictly controlled and would only be allowed under specific maintenance type events with electronic and physical enablers required. Though this level of security could be provided by software, EGMs which include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

In at least one embodiment, at the start of the game, the player may enter playing tracking information via a player tracking interface. Further, other game preferences of the player playing the game may be read from a card inserted into a card reader. During the game, the player views game information using the video display 8. During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input buttons of the button panel 110, touchscreen display(s), and/or other devices which enable players to input information into the EGD.

As noted above, one important consideration for casino operators relates to the ability of EGD service technicians to quickly access (e.g., for purpose(s) of servicing, inspecting, repairing, testing, etc.) EGDs (and associated EGD components) deployed in the field. For example, if a component of an EGD (or component thereof) needs to be inspected, serviced, and/or tested, a service technician may be dispatched to the EGD's location (e.g., on the casino floor) in order to perform the desired service/testing/inspection "on site" (e.g., without having to remove the EGD from the casino floor).

Most EGDs typically include some type of button panel which is configured or designed to receive various types of input from a player relating to game play activities and/or wagering activities. Different button panel embodiments may be configured or designed to include a variety of different mechanical and/or electrical components such as, for example: processors, memory, electrical connectors, mechanical connectors, security mechanisms, mechanical buttons, touchscreens, electronic buttons, sensors, speakers, lights, etc.

EGD button panels are typically intended to server as the primary mechanisms for enabling players to provide gameplay input and/or wagering input to an EGD. For this reason, the button panel of an EGD typically experiences considerably more wear and tear (e.g., from player interaction) than the other components of the EGD, which, in turn, typically requires the components of the button panel to be inspected and/or serviced more frequently.

In many situations, the servicing or inspection of an EGD button panel (and/or its components) may require removal or detachment of the button panel from the gaming machine cabinet. However, in many of today's EGD designs, the removal or detachment of the button panel can only be achieved via access the interior of the gaming machine cabinet. One reason for designing EGDs in this manner is that it provides some perceived security benefits. For example, access to the interior of a gaming machine cabinet is typically controlled via the opening/closing of the main access door (e.g., 142), and most EGD typically include a variety of security mechanisms to monitor, detect, and track when the main access door has been opened/closed, and (in some cases) by whom. Accordingly, the removal or detachment of the button panel may be more securely controlled by designing the EGD such that its button panel can only be removed or detached via access the interior of the gaming machine cabinet.

However, it is also recognized that such EGD designs may also introduce one or more additional security risks. For example, if a service technician is required to open the main access door and access the interior of the gaming machine cabinet in order to remove or detach the button panel, this situation may create an additional security risk since, for example, the opening of the main access door also provides access to other components within the interior of the gaming machine cabinet, which may subsequently be tampered with while the main access door is in its open position.

In order to mitigate such additional security risks, one aspect of the present disclosure is directed to an improved EGD button panel assembly design in which the button panel may be securely and removably attached/detached to/from the gaming machine cabinet in a manner which does not require the opening of the main access door, and in a manner which does not require access to the interior of the gaming machine cabinet.

Another aspect of the present disclosure is directed to an improved EGD button panel assembly design which employs the use of non-removable mechanical fasteners for enabling the EGD button panel to be securely and removably attached/detached to/from the gaming machine cabinet without requiring the removal of mechanical fasteners.

Yet another aspect of the present disclosure is directed to an improved EGD button panel assembly design which employs the use of non-removable mechanical fasteners for enabling the EGD button panel to be securely and removably attached/detached to/from the gaming machine cabinet by a human technician, and without requiring the use of hardware tools such as screwdrivers, wrenches, pliers, etc.

A further aspect of the present disclosure is directed to an improved button panel assembly security design which is configured or designed to allow the button panel assembly (and/or selected components thereof) to be removably attached/detached to/from the gaming machine cabinet without disrupting power to the EGD's button panel intrusion sensor(s)/switch(s).

Figure 2:
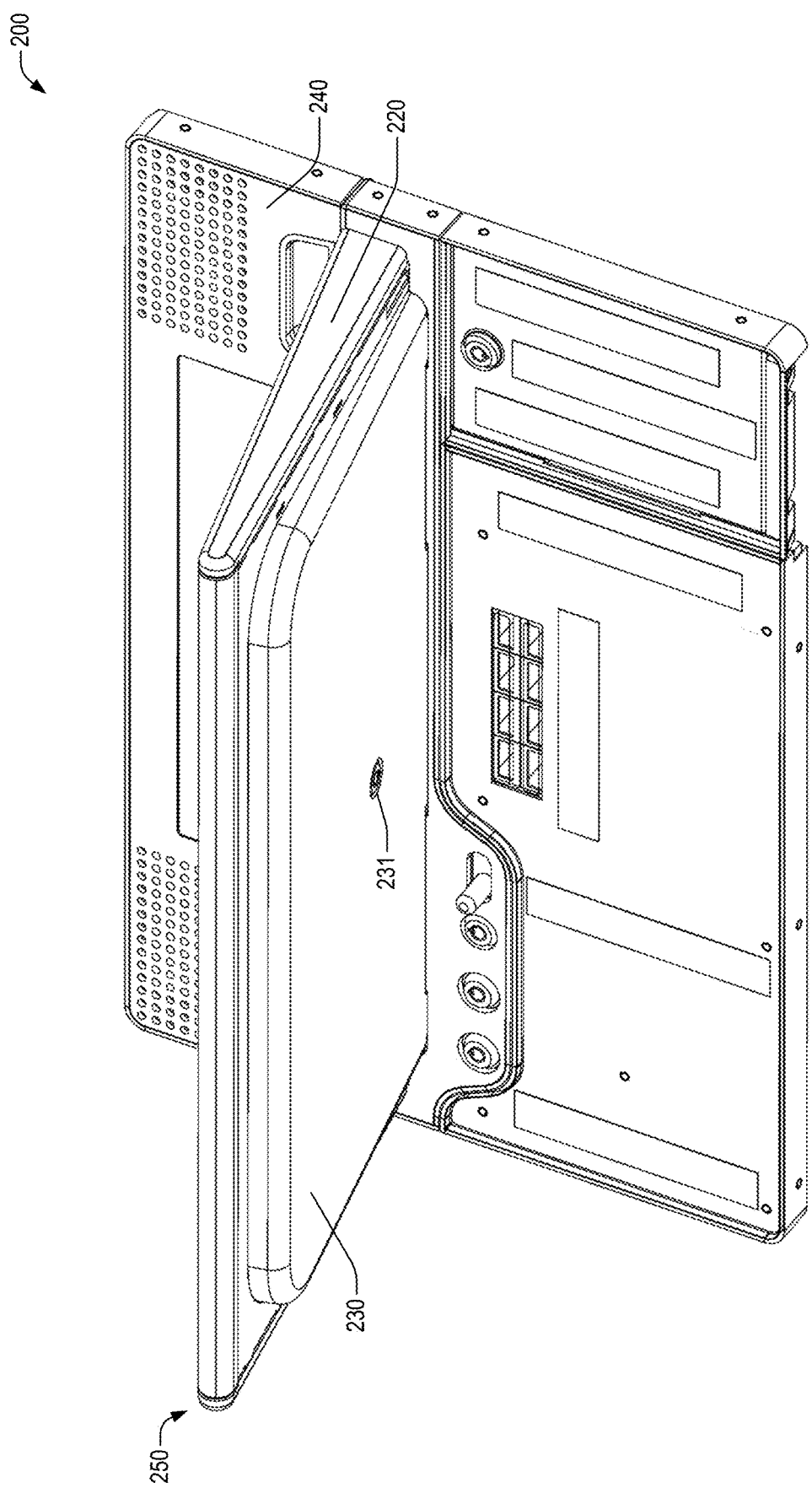
FIG. 2 shows a front perspective view of a portion 200 of EGD components in accordance with a second embodiment.

FIG. 2 shows a front perspective view of a portion 200 of EGD components in accordance with a second embodiment. As illustrated in the example embodiment of FIG. 2, EGD portion 200 includes a button panel assembly 250 which is mounted or attached to the EGD cabinet, and which extends outward from the front portion 240 of the cabinet. In the example embodiment of FIG. 2, the button panel assembly 250 includes, for example:

Button panel support frame assembly 220 (e.g., including side rails and front bumper).

Button panel access assembly 230, including lock/key interface 231; and

Figure 7:
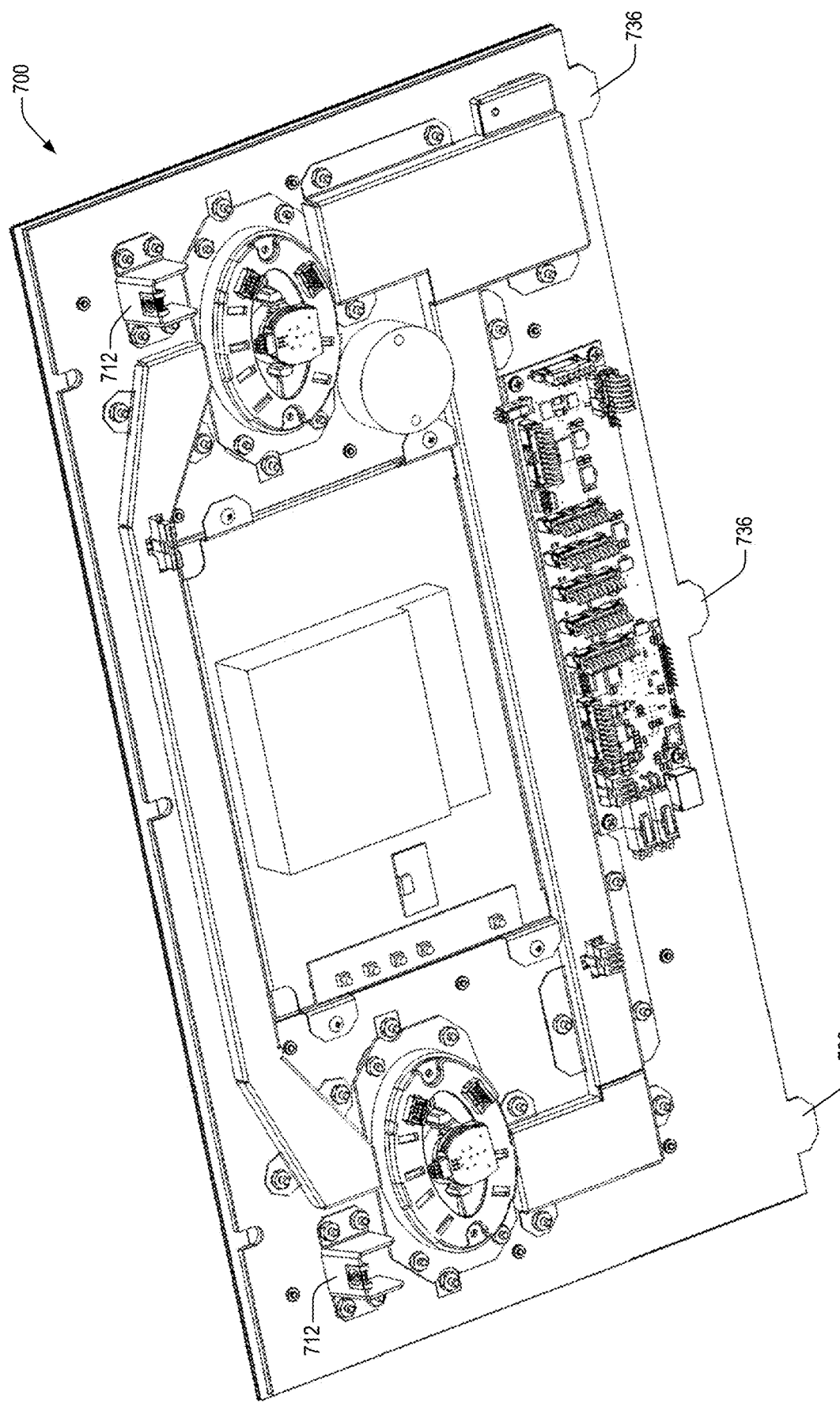
FIG. 7 shows a bottom perspective view of a button panel 700 (also referred to as a "button deck") in accordance with one embodiment.

Button panel (e.g., illustrated in FIG. 7).

According to at least one embodiment, in order to access the internal components of the button panel and/or in order to detach or remove the button panel from the button panel support frame assembly, one must first unlock and remove the button panel access assembly 230. To accomplish this, an appropriate key may be inserted into the lock/key interface 231, and then rotated.

Figure 3:
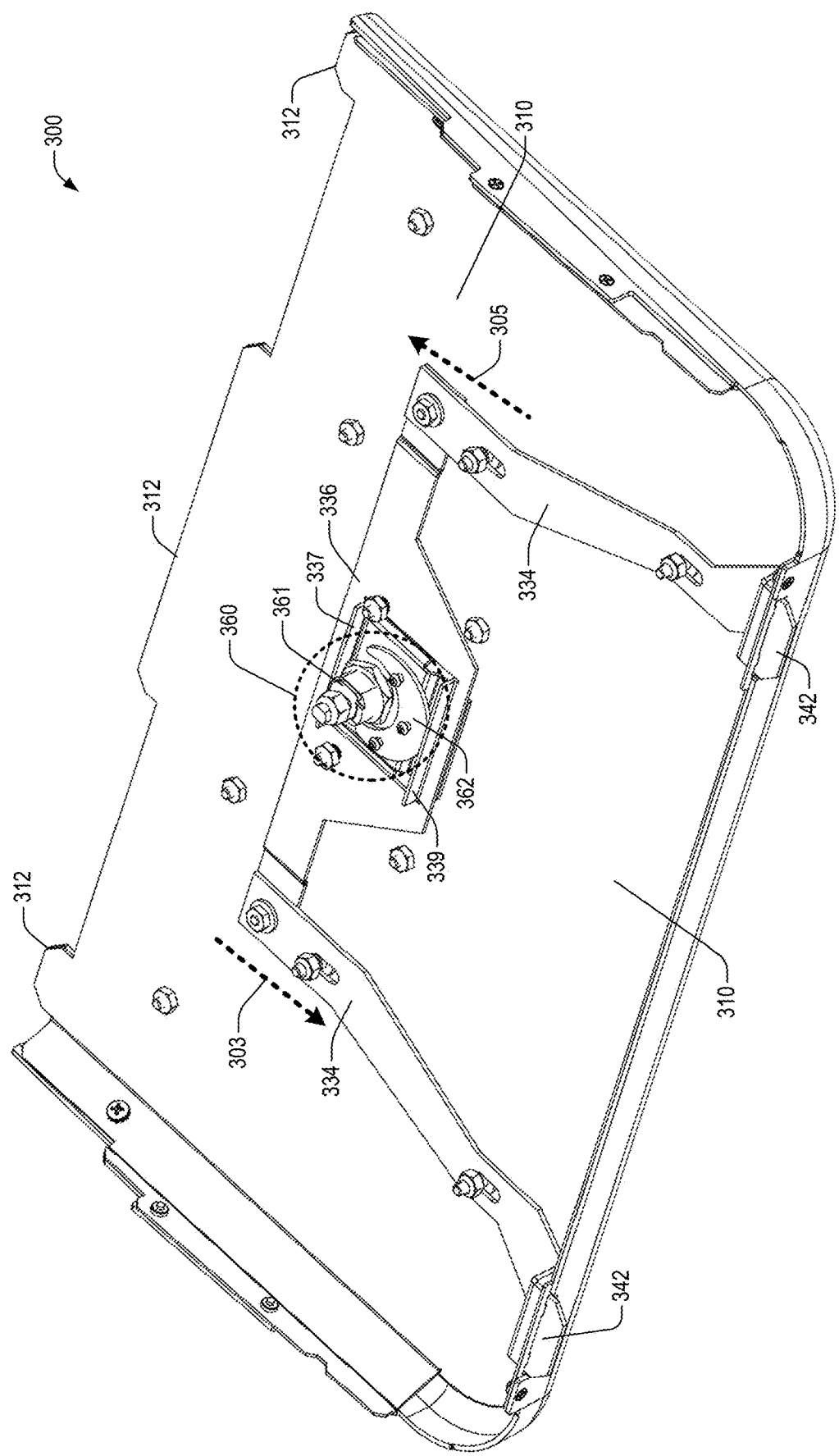
FIG. 3 shows a top perspective view of a button panel access assembly 300 in accordance with one embodiment.

FIG. 3 shows a top perspective view of a button panel access assembly 300 in accordance with one embodiment. As illustrated in the example embodiment of FIG. 3, button panel access assembly 300 may comprise a plurality of components, including, for example:

Security plate 310.

Lock cam assembly 360, which, as illustrated in FIG. 3, may include rotatable lock mechanism 361 and eccentric lock cam 362.

Lock bar assembly, which, as illustrated in FIG. 3, may include lock bars 334, lock bar connector plate 336 (including cam strike tabs 337, 339), and locking tabs 342. In at least one embodiment, the components of the lock bar assembly may be mechanically coupled together using various types of fasteners (e.g., screws, nuts, bolts, etc.), and configured or designed to allow the assembled lock bar assembly to be moved in a forward direction (e.g., as indicated by directional arrow 303) and to be moved in a backward direction (e.g., as indicated by directional arrow 305).

And/or other components (not shown) such as, for example, spring/tension components, cover plates, switches, sensors, electrical circuitry, connectors, fasteners, and the like.

As illustrated in the example embodiment of FIG. 3, the lock cam assembly 360 includes an eccentric lock cam 362 which is fastened to a rotatable lock mechanism 361. In at least one embodiment, when the button panel access assembly is initially configured in a "closed" or "locked" position (e.g., as illustrated in FIG. 3), the eccentric lock cam 362 is initially engaged against cam strike tab 339. As the lock mechanism 361 is rotated (e.g., in a counterclockwise direction), the eccentric lock cam 362 is caused to rotate in the same counterclockwise direction, thereby causing the eccentric lock cam to disengage from cam strike tab 339. As the eccentric lock cam continues to rotate in a counterclockwise direction, it eventually engages with and pushes against cam strike tab 337, which causes the lock bar connector plate 336 to move in a "backwards" direction, as indicated by directional arrow 305. The backwards movement of the lock bar connector plate 336, in turn, causes lock bars 334 to also move in a "backwards" direction (e.g., as indicated by directional arrow 305), which, in turn, causes locking tabs 342 to also move in the same "backwards" direction until they are eventually moved into a "retracted" position. As explained in greater detail with respect to FIGS. 5 and 6, this backward movement (or retraction) of locking tabs 342 enables the button panel access assembly 300 to be detached from the button panel support frame assembly (e.g., 400, FIG. 4).

In a similar (but opposite) manner, when the button panel access assembly is initially configured in an "open" or "unlocked" position (e.g., with the locking tabs in their retracted position), the eccentric lock cam 362 is initially engaged against cam strike tab 337. As the lock mechanism 361 is rotated (e.g., in a clockwise direction), the eccentric lock cam 362 is caused to rotate in the same clockwise direction, thereby causing the eccentric lock cam to disengage from cam strike tab 337. As the eccentric lock cam continues to rotate in a clockwise direction, it eventually engages with and pushes against cam strike tab 339, which causes the lock bar connector plate 336 to move in a "forwards" direction, as indicated by directional arrow 303. The forwards movement of the lock bar connector plate 336, in turn, causes lock bars 334 to also move in a "forwards" direction (e.g., as indicated by directional arrow 303), which, in turn, causes locking tabs 342 to also move in the same "forwards" direction until they are eventually moved into an "extended" position. As explained in greater detail with respect to FIGS. 5 and 6, this forward movement (or extending) of locking tabs 342 enables the button panel access assembly 300 to be securely attached to the button panel support frame assembly (e.g., 400, FIG. 4). In at least one embodiment, while the button panel assembly is securely attached to the EGM cabinet, the back or rear portion of the button panel access assembly (e.g., including tab portions 312) is securely seated in one or more slots or pockets integrated into the front panel portion or dashboard portion of the EGM cabinet.

Figure 4:
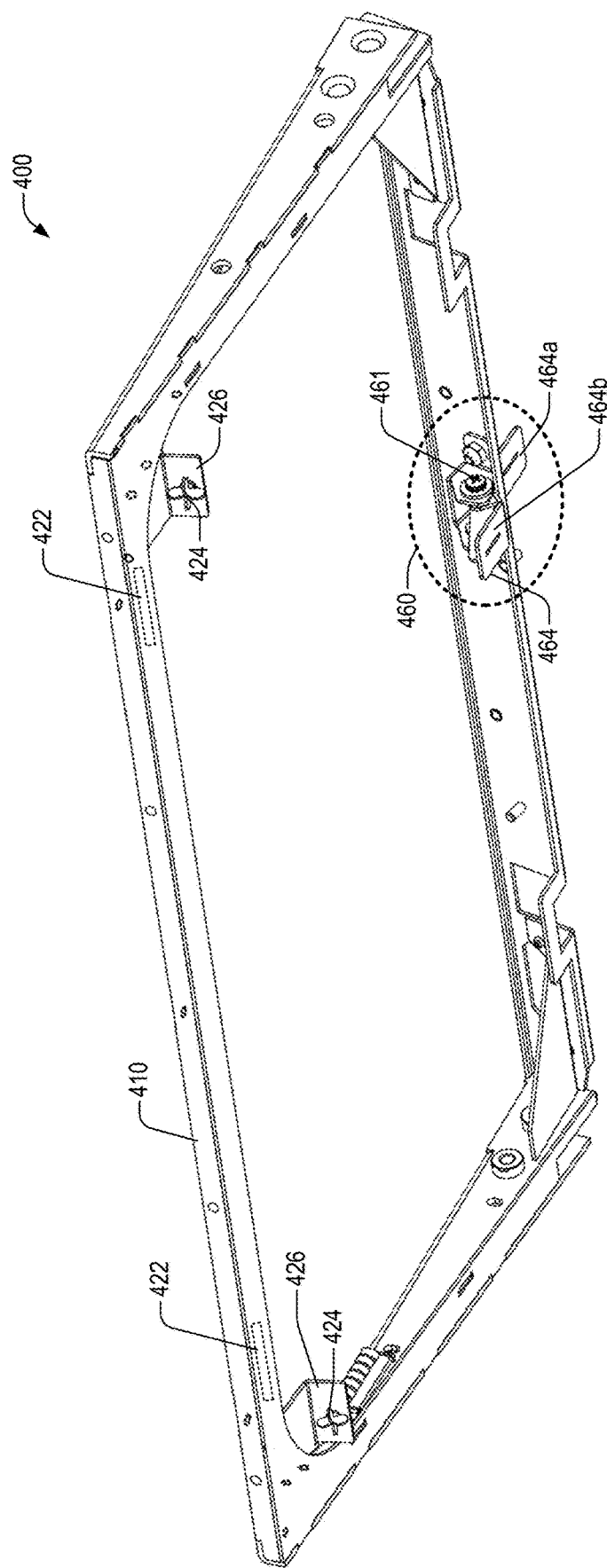
FIG. 4 shows a bottom perspective view of a button panel support frame assembly 400 in accordance with one embodiment.

FIG. 4 shows a bottom perspective view of a button panel support frame assembly 400 in accordance with one embodiment. As illustrated in the example embodiment of FIG. 4, button panel support frame assembly 400 may comprise a plurality of components, including, for example:

Frame assembly 410. For example, as illustrated in the example embodiment of FIG. 4, the frame assembly 410 is comprised of a plurality of different support members which are assembled together to form a frame which is generally rectangular in shape. Additionally, in at least some embodiments, the frame assembly may include slot portions 422, which are configured or designed to interface with the locking tabs (342, FIG. 3) of the button panel access assembly.

Button panel fastener components 424, 426. As described in greater detail with respect to FIGS. 7-10, and 13, the button panel fastener components 424, 426 may be implemented as non-removable mechanical fasteners which may be configured or designed to enable an EGD button panel (e.g., 700, FIG. 7) to be securely and removably attached/detached to/from the Button panel support frame assembly without requiring the removal of the mechanical fasteners (e.g., 424). Additionally, in at least some embodiments, the non-removable mechanical fasteners 424 may be configured or designed to enable the EGD button panel to be securely and removably attached/detached to/from the gaming machine cabinet by a human technician, and without requiring the use of hardware tools such as screwdrivers, wrenches, pliers, etc.

Intrusion lever assembly 460, which, as illustrated in FIG. 4, may include a movable lever (e.g., comprising end portions 462, 464) that is movably mounted on a hinge or pivot (e.g., 461). As described in greater detail with respect to FIGS. 11-12, the intrusion lever assembly 460 may be utilized as part of an improved button panel assembly security system which is configured or designed to detect the removal of the button panel access assembly and/or other intrusions relating to the button panel assembly (and/or components thereof). Additionally, the intrusion lever assembly 460 may also be configured or designed to enable the button panel assembly (and/or selected components thereof) to be removably attached/detached to/from an EGD cabinet without disrupting power to the EGD's button panel intrusion sensor(s)/switch(s).

And/or other components (not shown) such as, for example, spring/tension components, cover plates, switches, sensors, electrical circuitry, connectors, fasteners, and the like.

Figure 5:
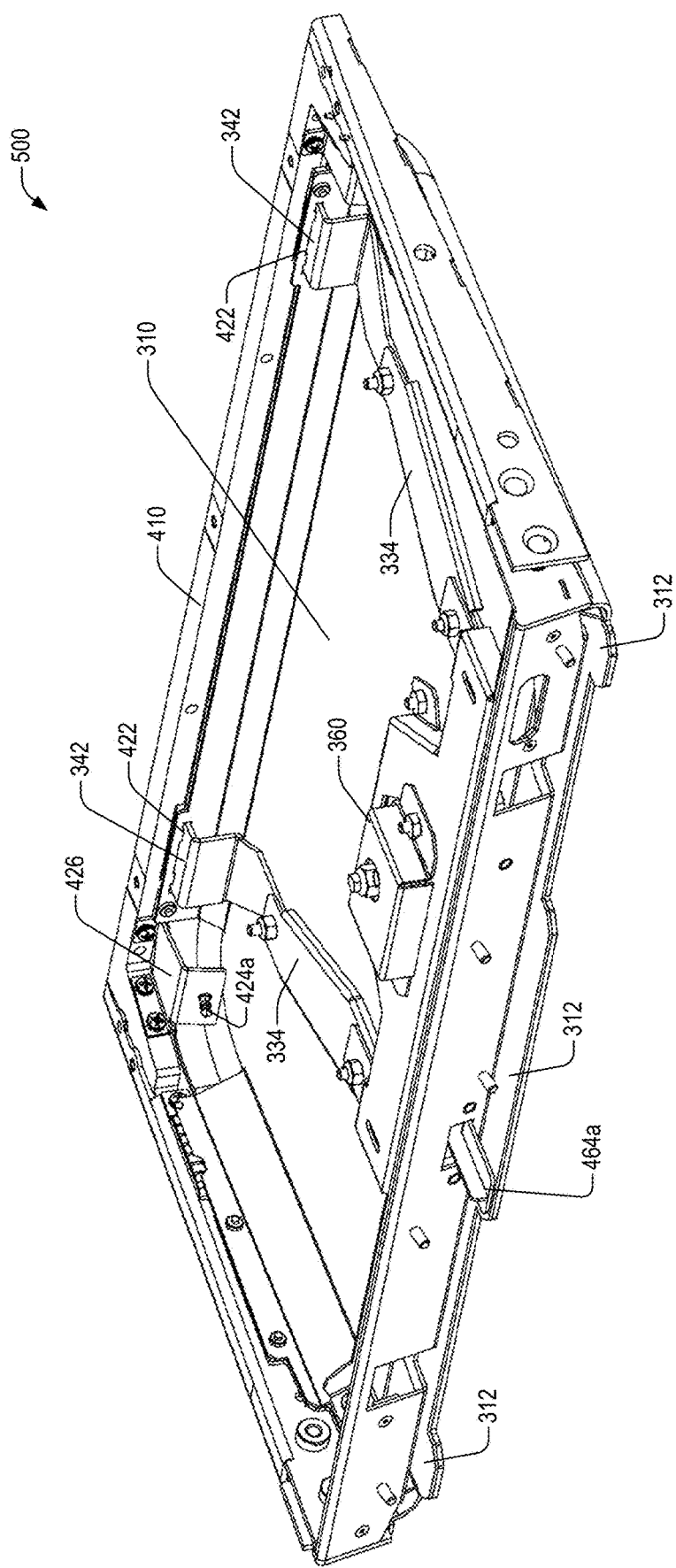
FIG. 5 shows a rear perspective view of selected portions 500 of the button panel assembly in accordance with one embodiment.

FIG. 5 shows a rear perspective view of selected portions 500 of the button panel assembly in accordance with one embodiment. More specifically, FIG. 5 illustrates an example embodiment of how the components of the button panel access assembly (e.g., 300, FIG. 3) and the components of the button panel support frame assembly (e.g., 400, FIG. 4) interface or engage with each other when the button panel assembly is configured in a locked or closed position.

For example, as illustrated in the example embodiment of FIG. 5, when the button panel assembly is configured in a locked or closed position, the locking tabs 342 of the button panel access assembly extend into (or through) the slots 422 which are integrated into the frame assembly 410. This configuration enables the button panel access assembly to be securely attached to the button panel support frame assembly.

In order to unlock and detach the button panel access assembly from the button panel support frame assembly, a key is inserted into the lock/key interface (e.g., 231, FIG. 2), and then rotated. As the lock mechanism is rotated, the internal components of the button panel access assembly cause locking tabs 342 to retract from the slots 422 of the support frame, thereby enabling the button panel access assembly to be detached from the button panel support frame assembly, as illustrated, for example, in FIG. 6.

Figure 6:
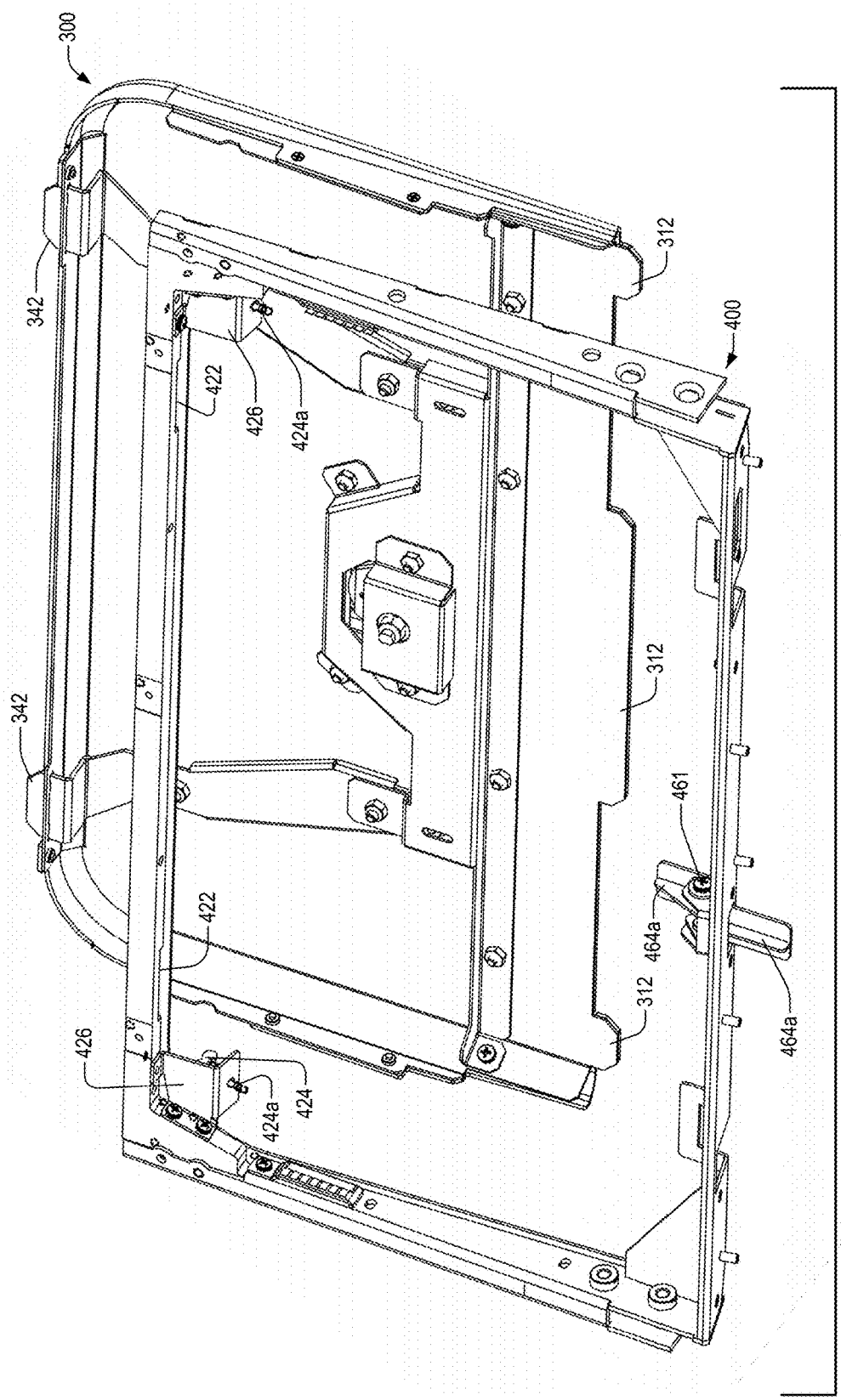
FIG. 6 shows a top perspective view of selected portions 600 of the button panel assembly in accordance with one embodiment.

FIG. 6 shows a top perspective view of selected portions 600 of the button panel assembly in accordance with one embodiment. More specifically, FIG. 6 illustrates the detachment of the button panel access assembly 300 from the button panel support frame assembly 400.

In at least one embodiment, detaching the button panel access assembly 300 from the button panel support frame assembly 400 allows access to the interior components of the Button panel support frame assembly, including button panel fastener components 424.

In at least one embodiment, the button panel fastener components 424 may include quarter-turn fasteners (e.g., such as that illustrated in FIG. 13) which are held in place brackets 426. As illustrated in the example embodiment of FIG. 6, the brackets 426 are attached to the frame of the button panel support frame assembly. The quarter-turn fasteners are mounted to brackets 426 in a manner which permits each of the quarter-turn fasteners to rotate about its respective longitudinal axis.

Figure 13:
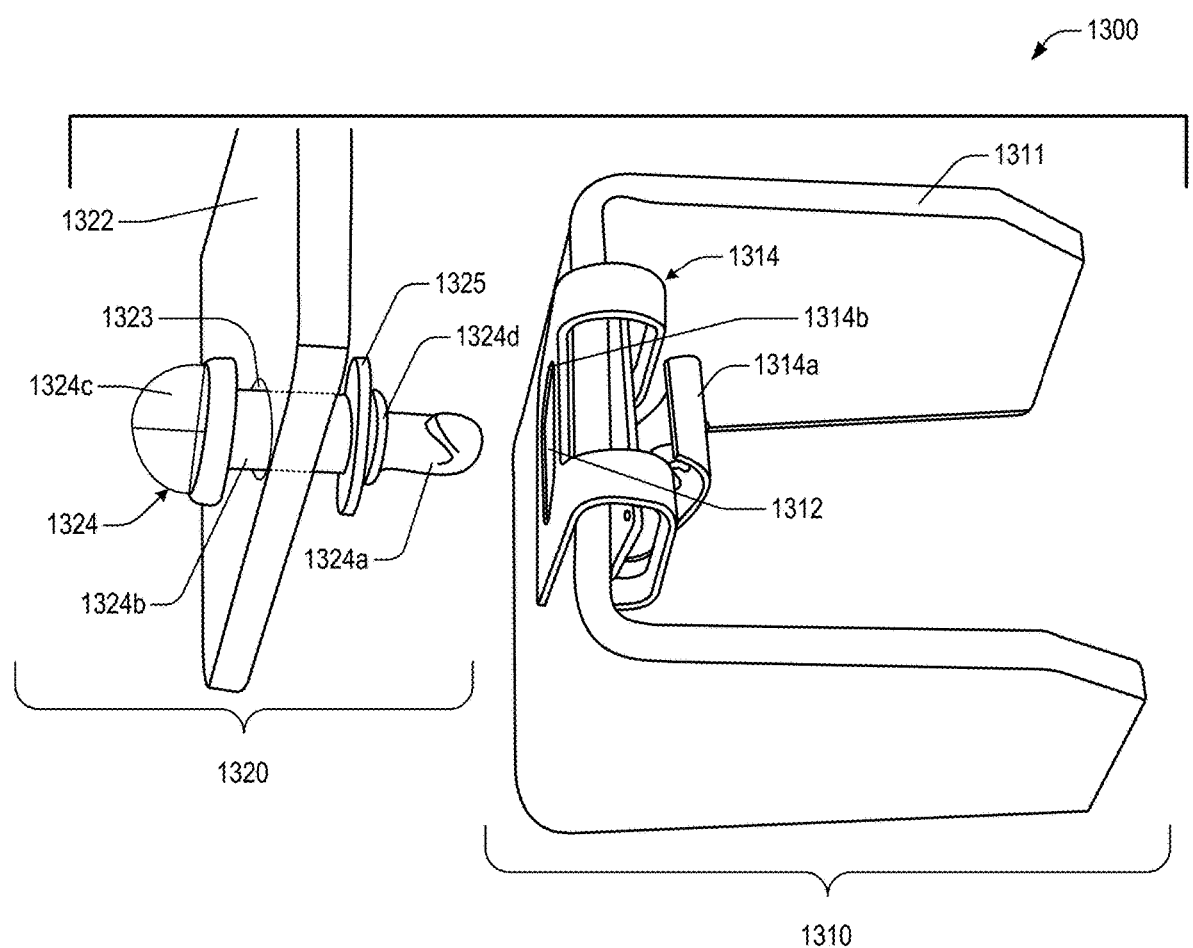
FIG. 13 shows a specific embodiment of a quarter-turn fastener locking mechanism 1300.

FIG. 13 shows a specific embodiment of a quarter-turn fastener locking mechanism 1300 which may be deployed at the EGD to enable the EGD button panel to be securely and removably attached/detached to/from the button panel support frame assembly in manner which does not require access to the interior of the gaming machine cabinet.

As illustrated in the example embodiment of FIG. 13, the quarter-turn fastener locking mechanism 1300 may include a fastener assembly portion 1320 which is configured to detachably engage with receptacle assembly portion 1310.

According to different embodiments, components of the fastener assembly portion 1320 may include, for example:

- Quarter-turn fastener 1324, which, as illustrated in FIG. 13, may include head portion 1324c, shaft portion 1324b, and nose portion 1324a. In some embodiments, quarter turn fastener 1324 may also include flange portion 1324d.
- Plate portion 1322 having an aperture 1323 disposed therein, the aperture being configured or designed to allow the shaft portion 1324b of the quarter-turn fastener to pass therethrough.
- Retaining washer 1325, which, for example, may be configured or designed to prevent of the quarter turn fastener from being removed from the plate portion 1322.

According to different embodiments, components of the receptacle assembly portion 1310 may include, for example:

- Bracket portion 1311 having an aperture 1312 disposed therein for receiving the nose portion 1324a of the quarter-turn fastener.
- Locking clip portion 1314, which, as illustrated in FIG. 13, may include an aperture 1314b for receiving the nose portion 1324a of the quarter-turn fastener, and may include clip body portion 1314a.

In at least one embodiment, clip body portion 1314a may be configured or designed to engage with nose portion 1324a in a manner which enables the fastener assembly portion 1320 to be removably connected to receptacle assembly portion 1310. For example, in one embodiment, the fastener assembly portion 1320 may be securely connected to the receptacle assembly portion 1310 by inserting the nose portion 1324a of the quarter-turn fastener through the apertures 1312 and 1314b, engaging nose portion 1324a with clip body portion 1314a, and rotating the quarter-turn fastener 1324 in a first direction (e.g., a clockwise direction) to cause nose portion 1324a and clip body portion 1314a to be in a "locked" configuration. Similarly, the fastener assembly portion 1320 may be detached from the receptacle assembly portion 1310 by rotating the quarter-turn fastener 1324 in a second direction (e.g., counterclockwise direction) to cause nose portion 1324a to disengage from clip body portion 1314a.

It will be appreciated that different EGM embodiments may utilize different types of quarter-turn fastener locking mechanisms in order to securely and removably attach/detach the EGD button panel (e.g., 700, FIG. 7) to/from the button panel support frame assembly (e.g., 400, FIG. 4). For example, in at least one embodiment, a plurality of quarter-turn fastener assembly components (e.g., 424, 426, FIG. 4) may be mounted to the button panel support frame assembly (e.g., 400, FIG. 4) and configured or designed to detachably connect to a respective plurality of receptacle assembly components (e.g., 712, FIG. 7) that are mounted on the underside of button panel 700 (FIG. 7).

FIG. 7 shows a bottom perspective view of a button panel 700 (also referred to as a "button deck") in accordance with one embodiment. According to different embodiments, button panel 700 may comprise a plurality of components, including, for example, receptacle assembly components 712, switches, sensors, electrical circuitry, electrical connectors, electrical interfaces, mechanical connectors, fasteners, and the like. As illustrated in the example embodiment of FIG. 7, receptacle assembly components 712 are mounted to the bottom side of button panel 700 at specific locations so as to allow the receptacle assembly components 712 to engage with the quarter-turn fastener assembly components mounted to the button panel support frame assembly, as illustrated, for example, in FIG. 8.

Figure 8:
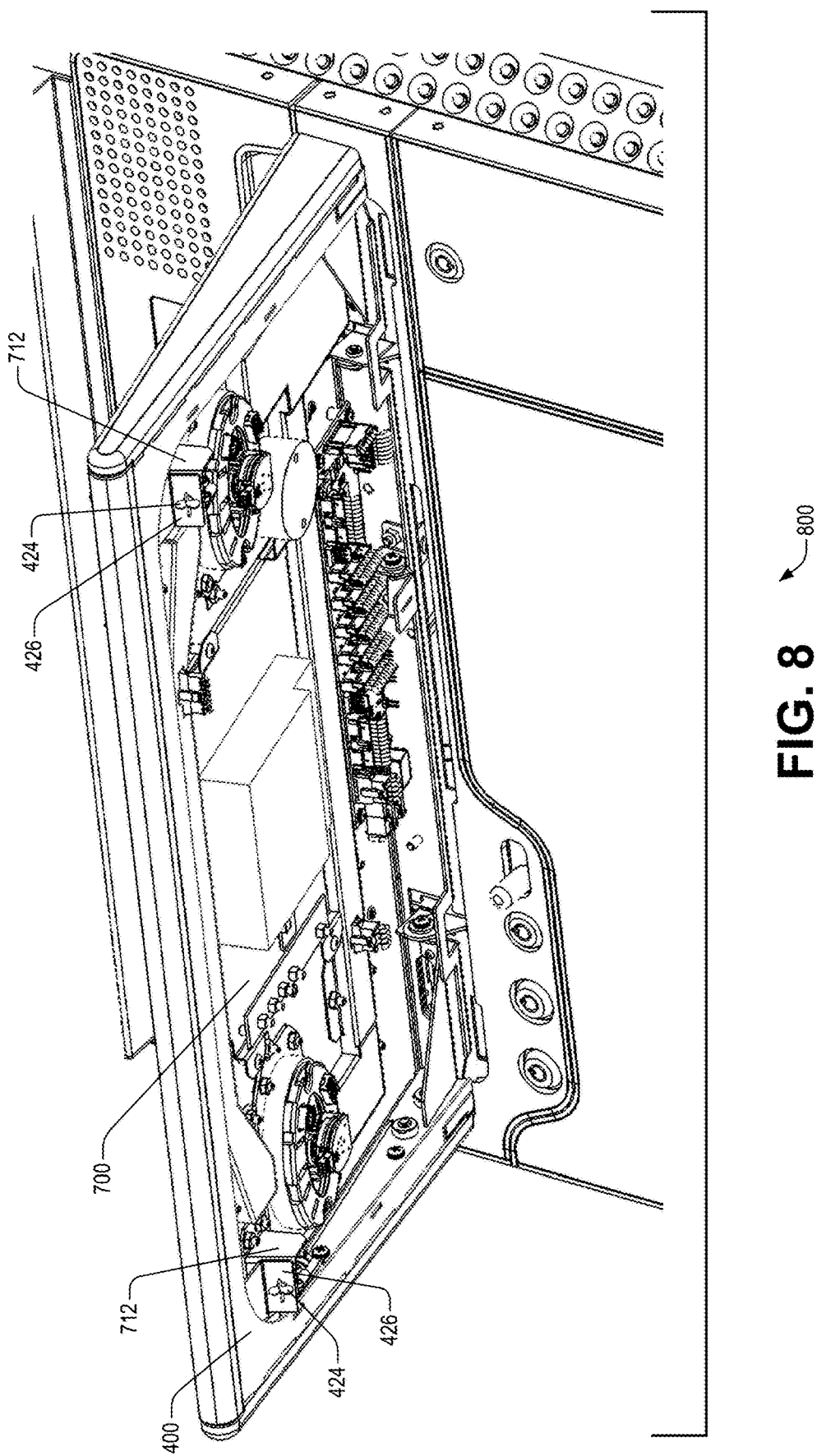
FIG. 8 shows a bottom perspective view of selected portions 800 of the button panel assembly in accordance with one embodiment.

FIG. 8 shows a bottom perspective view of selected portions 800 of the button panel assembly in accordance with one embodiment. More specifically, FIG. 8 illustrates an example embodiment of how the components of the button panel 700 and the components of the button panel support frame assembly 400 interface or engage with each other when the button panel assembly is configured in a locked or closed position.

As illustrated in the example embodiment of FIG. 8, the quarter-turn fasteners 424 (which are attached to the button panel support frame via brackets 426) are securely engaged with the receptacle assembly components 712 mounted to the button panel. The button panel attaches to the button panel support frame via two captive quarter-turn fasteners 424 which are accessible once the button deck access panel is removed.

The button panel may be disengaged from button deck support frame by rotating each of the quarter-turn fasteners 712 (e.g., in a counterclockwise direction). In at least one embodiment, the quarter turn fasteners may be rotated by hand, without requiring the use of hand tools such as screwdrivers, wrenches, etc.

Figure 9:
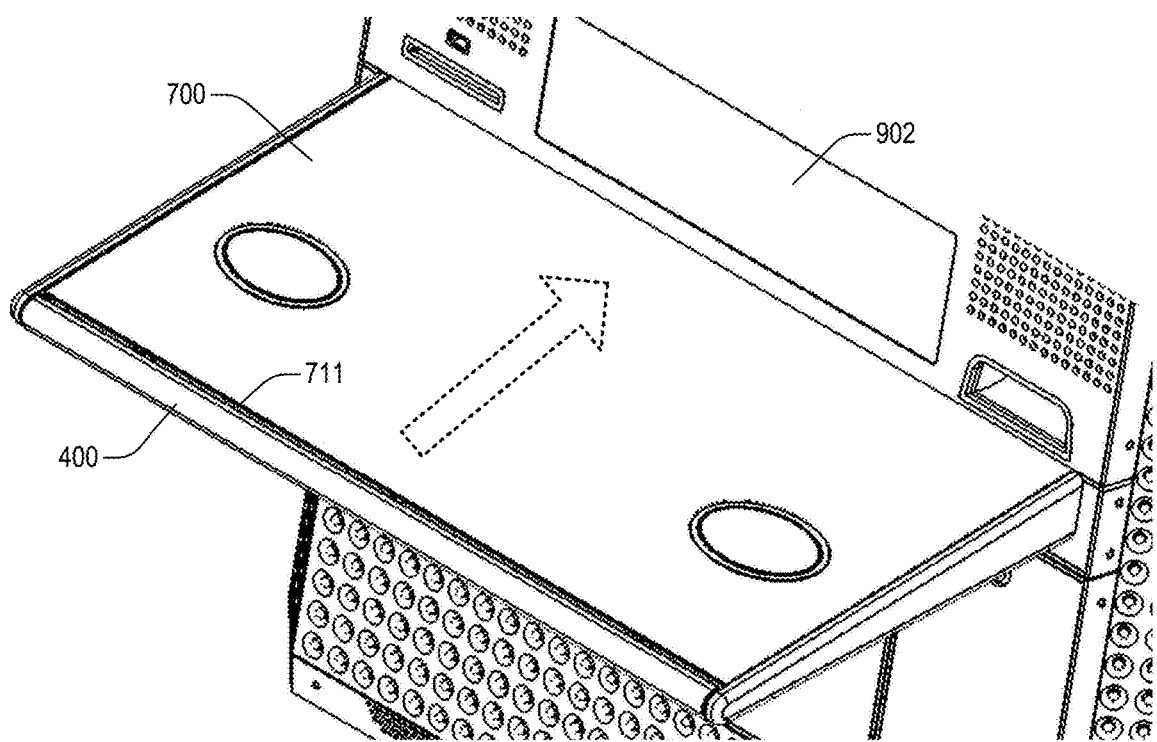
FIGS. 9-10 show a front perspective view of selected portions of the EGD, illustrating how the button panel 700 may be detached from the button panel assembly.
Figure 10:
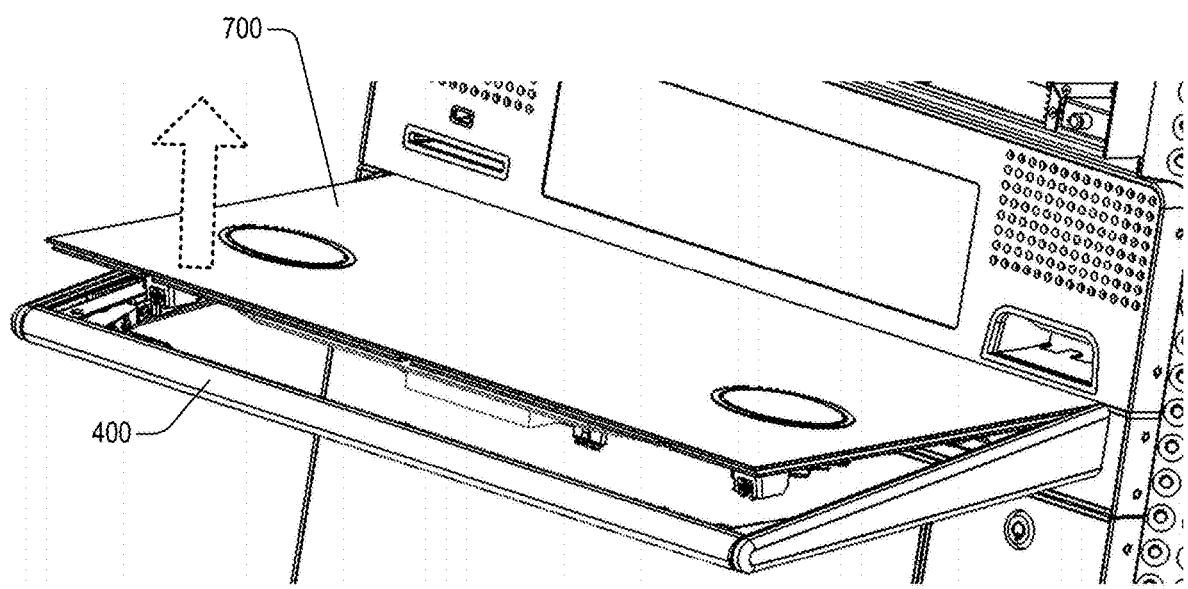

FIGS. 9-10 show a front perspective view of selected portions of the EGD, illustrating how the button panel 700 may be detached or removed from the button panel assembly.

For example, once the quarter turn fasteners have been rotated to their "unlocked" positions, the button panel 700 may be removed or detached from the button panel support frame assembly 400 by sliding button panel back toward cabinet (e.g., as illustrated in FIG. 9), and then lifting the front portion of the button panel upwards (e.g., as illustrated in FIG. 10). In at least one embodiment, the EGM cabinet includes a slot or pocket which is integrated into the front panel portion (or dashboard portion) of the EGM cabinet, and which is configured or designed to securely receive the back or rear portion of the button panel (e.g., including rear tab portions 736, FIG. 7).

To securely attach the button panel to the button panel support frame assembly, the rear portion of the button panel may be inserted into the a slot or pocket integrated into the front panel portion (or dashboard portion) of the EGM cabinet, and then the front portion of the button panel lowered until it is properly seated on the button panel support frame assembly. The button panel may then be slid forward in order to allow the quarter-turn fasteners 424 to engage with the receptacle assembly components 712. Once the components are properly engaged with each other, the quarter turn fasteners may be rotated (e.g., in a clockwise direction) until the quarter-turn fastener locking mechanism is configured to its "locked" configuration.

It will be appreciated that the various EGD button panel assembly embodiments described herein advantageously provide the ability for an EGD button panel to be securely and removably attached/detached to/from the gaming machine cabinet (and/or from the button panel support frame assembly) in a manner which does not require the access to the interior of the gaming machine cabinet in order to remove the EGD button panel, and in a manner which does not require the use of hardware tools such as screwdrivers, wrenches, pliers, etc. Additionally, since the button panel is removably attached to the button panel support frame assembly using captive mechanical fasteners (e.g., which are not removable), this provides the added benefit of enabling the EGD button panel to be securely and removably attached/detached to/from the gaming machine cabinet (and/or from the button panel support frame assembly) without requiring the removal of any mechanical fasteners.

It will be appreciated that quarter-turn fasteners are but one example from a wide range of suitable fasteners which may provide one or more the benefits and advantages described above. For example, other types of suitable fasteners may include, but are not limited to, one or more of the following (or combinations thereof): draw latches, one-piece flexible hand latches, adjustable draw latches, and/or other suitable fasteners commonly known to one having ordinary skill in the art.

Another aspect of the present disclosure is directed to an improved button panel assembly security system which is configured or designed to allow the button panel assembly (and/or selected components thereof) to be removably attached/detached to/from the gaming machine cabinet without disrupting power to the EGD's button panel intrusion sensor(s)/switch(es).

Typically, many of today's EGDs are configured or designed to include at least one button panel intrusion switch inside the button panel assembly portion of the EGM. In contrast, in at least some of the EGD embodiments described herein (e.g. as illustrated, for example, in FIGS. 11-12), the button panel intrusion switch is located outside of the button panel assembly, such as, for example, in the interior of the EGM cabinet. By locating the switch outside of the button panel assembly, the button panel assembly (and/or selected components thereof) is able to be detached from the gaming machine cabinet without having to disrupt power to the button panel intrusion switch/sensor.

Figure 11:
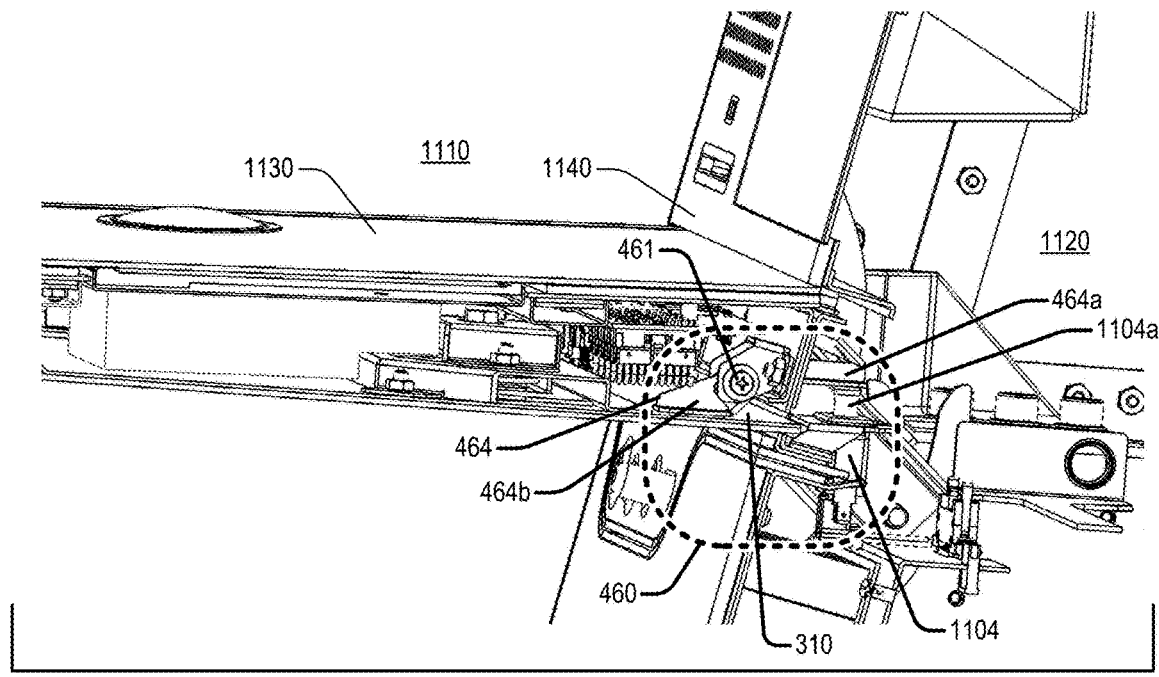
FIGS. 11-12 show side perspective views of selected portions 1100 of the button panel assembly in accordance with one embodiment.
Figure 12:
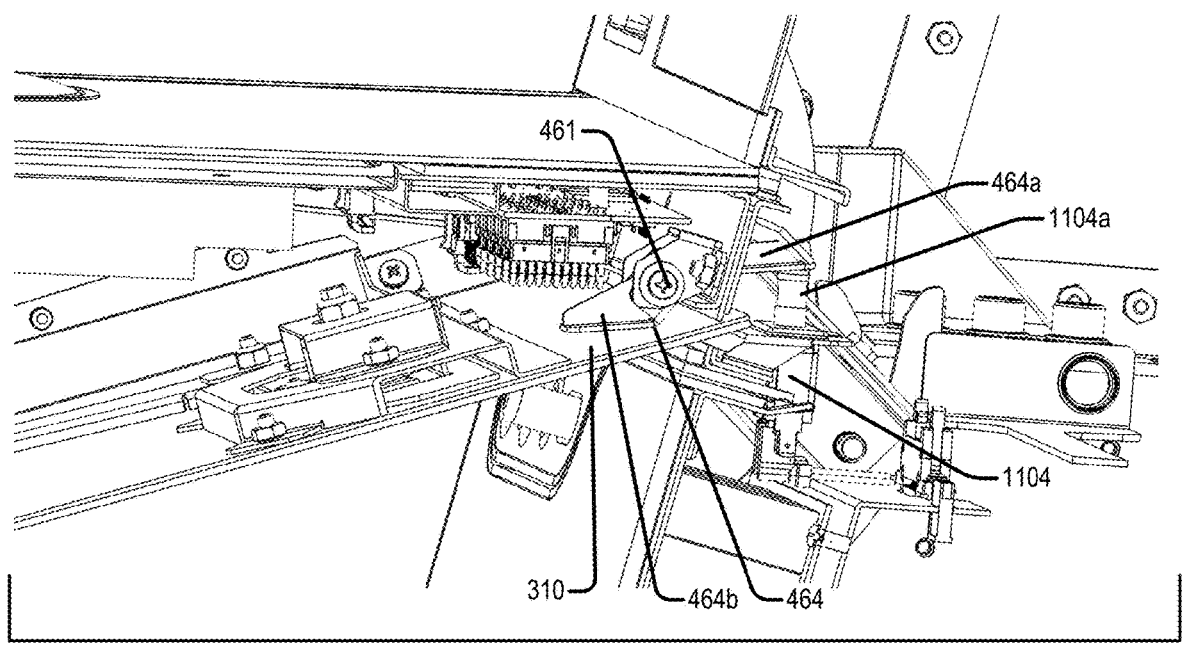

FIGS. 11-12 show side perspective views of selected portions 1100 of the button panel assembly in accordance with one embodiment. More specifically, FIG. 11 shows a cutaway side view of an EGD cabinet, showing selected components located at the interior region 1120 of the gaming machine cabinet, and showing selected components located at the exterior region 1110 of the gaming machine cabinet. For reference purposes, the front face of the EGD cabinet 1140 represents the dividing line (or dividing plane) between the EGD interior 1120 and the EGD exterior 1110.

As illustrated in the example embodiment of FIG. 11, a cutaway side view of the button panel assembly 1130 reveals a portion of the internal components of the button panel assembly, including, for example: security plate 310 (e.g., which is part of the button panel access assembly); and portions of the intrusion lever assembly 460 (e.g., intrusion lever 464, intrusion lever pivot 461). Additionally, as illustrated in the example embodiment of FIG. 11, the cutaway side view of the gaming cabinet reveals a portion of the internal components of gaming cabinet, including, for example, a button panel intrusion switch 1104. In at least one embodiment, the button panel intrusion switch 1104 may be configured or designed as a plunger switch which includes a movable plunger component 1104a. Movement of the plunger component may cause the button panel intrusion switch to switch between at least two states, depending on the relative position of the plunger component. For example, when the plunger component 1104a is in a "retracted" position (e.g., as shown in FIG. 11), it may cause the button panel intrusion switch 1104 to be in a first state (e.g., which may represent an "all secure" condition at the button panel assembly). When the plunger component 1104a is in an "extended" position (e.g., as shown in FIG. 12), it may cause the button panel intrusion switch 1104 to be in a second state (e.g., which may represent an "intrusion detected" condition at the button panel assembly).

In at least one embodiment, the intrusion lever 424 is mounted on a pivot (or hinge) component 461 which is attached to the button panel support frame assembly (see also FIG. 4). As illustrated in the example embodiment of FIG. 11, a first portion 464b of the intrusion lever is located in the interior of the button panel assembly, and a second portion 464a of the intrusion lever passes through an aperture in the gaming machine cabinet, and extends into the interior region 1120 of the gaming machine cabinet.

In at least one embodiment, the intrusion lever 464 is mounted on the pivot component 461 in a manner such that, in its natural resting state, the first portion 464b of the intrusion lever exerts relatively more downward force on the pivot point than that of the second portion 464a of the intrusion lever. For example, in one embodiment, the first portion 464b of the intrusion lever may be configured or designed to be relatively heavier than the second portion 464a of the intrusion lever (e.g., relative to the pivot point). In another embodiment, the button panel intrusion switch may include a spring-loaded plunger component which continuously exerts upward force on the bottom surface of the second portion 464a of the intrusion lever.

For purposes of illustration, it is assumed in the example embodiment of FIG. 11 that the button panel assembly is configured in a "locked" or "secured" configuration, in which the button panel access assembly is securely fastened to the button panel support frame assembly. In this configuration, the bottom surface of the first portion 464b of the intrusion lever rests on a region of the security plate 310, which, in turn, causes the second portion 464a of the intrusion lever to push down on the plunger component 1104a, thereby causing the plunger component 1104a to be in a retracted position. In at least one embodiment, while the plunger component is in the retracted position, the button panel intrusion switch 1104 may generate at least one first output signal representing an "all secure" condition at the button panel assembly.

Turning now to FIG. 12, for purposes of illustration, it is assumed in the example embodiment of FIG. 12 that the button panel access assembly is at least partially disengaged from the button panel support frame assembly. In this configuration, the bottom surface of the first portion 464b of the intrusion lever is no longer supported by the security plate 310, which results in the first portion 464b of the intrusion lever moving downward, and the second portion 464a of the intrusion lever moving upward. This upward movement of the second portion 464a of the intrusion lever allows the plunger component 1104a to move from a retracted position to an extended position (e.g., as illustrated in FIG. 12). In at least one embodiment, while the plunger component is in the extended position, the button panel intrusion switch 1104 may generate at least one second output signal representing an "intrusion detected" condition at the button panel assembly.

It will be appreciated that the intrusion lever assembly 460 may be utilized as part of an improved button panel assembly security system which is configured or designed to detect the removal of the button panel access assembly and/or other intrusions relating to the button panel assembly (and/or components thereof). Additionally, the intrusion lever assembly 460 may also be configured or designed to enable the button panel assembly (and/or selected components thereof) to be removably attached/detached to/from an EGD cabinet without disrupting power to the EGD's button panel intrusion sensor(s)/switch(es).

Figure 14:
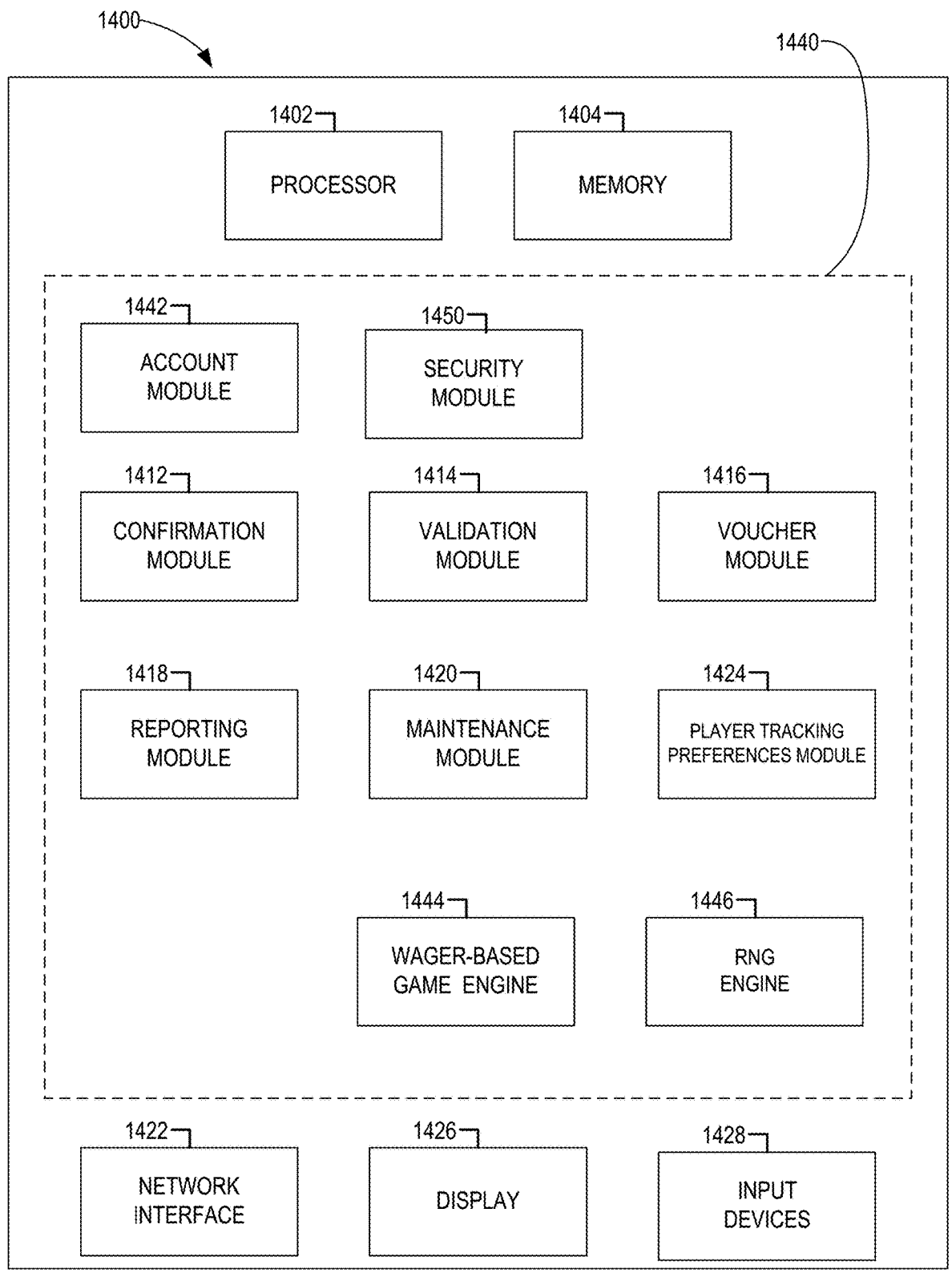
FIG. 14 shows a block diagram 1400 of electronic gaming device 1400, in accordance with a specific embodiment.

FIG. 14 shows a block diagram 1400 of electronic gaming device 1400, in accordance with a specific embodiment. Electronic gaming device 1400 may include a processor 1402, a memory 1404, a network interface 1422, input devices 1428, and a display 1426.

Processor 1402 may generate gaming options based on predetermined betting structures and/or outcome categories. Predetermined betting structures may utilize more than one outcome category to generate via processor 1402 gaming options. Predetermined betting structures may combine any outcome category with any other outcome category to gaming options.

Processor 1402 may offer a gaming option which is structured so that the gaming option relates to more than one EGD. Processor 1402 may generate contingent gaming options and/or predetermined gaming options. Contingent gaming options 1410 may include structures such that when a triggering event occurs over one or more than one gaming event, racing event, and/or sporting event, the wager is activated.

Network interface 1422 may include configured or designed to enable electronic gaming device 1400 to communicate with remote devices/systems such as, for example, video/multimedia server(s), accounting/transaction server(s), gaming server(s), authentication server(s), player tracking server(s), voucher server(s), etc.

Input devices 1428 may include mechanical buttons, electronic buttons, a touchscreen, a microphone, cameras, an optical scanner, or any combination thereof. Input devices 1428 may be utilized to make a wager, to make an offer to buy or sell a voucher, to determine a voucher's worth, to cash in a voucher, to modify (e.g., change sound level, configuration, font, language, etc.) electronic gaming device 1400, to select a movie or music, to select type of content to be displayed on main and/or auxiliary screen(s) of EGD, or any combination thereof.

Security Module 1450 may include security sensors, locks, interfaces, switches, etc. In at least one embodiment, may also be configured or designed to monitor and report conditions detected at each of the EGD's security sensors/switches, including button panel intrusion switch 1104 (FIG. 11).

Wager-Based Game Engine 1444 may be configured or designed to manage the wager-based game event portion(s) of the wager-based game.

Random Number Generator (RNG) Engine 1446 may include software and/or hardware algorithm and/or processes which are used to generate random outcomes, and may be used by the Wager-Based Game Engine to generate wager-based game event outcomes, at least a portion of which may correspond to predetermined wager-based game event outcomes (as described in greater detail below).

Display 1426 may show video streams from one or more gaming devices, gaming objects from one or more gaming devices, computer generated graphics, predetermined gaming options, and/or contingent gaming options.

Memory 1404 may include various memory modules 1440. Memory 1404 via various memory modules 1440 may include a confirmation module 1412, a validation module 1414, a voucher module 1416, a reporting module 1418, a maintenance module 1420, a player tracking preferences module 1424, and an account module 1432.

Confirmation module 1412 may utilize data received from a voucher, the transaction history of the voucher (e.g., the voucher changed hands in a secondary market), and/or the identity of the player to confirm the value of the voucher. In another example, confirmation module 1412 may utilize game event data, along with voucher data to confirm the value of the voucher.

Validation module 1414 may utilize data received from a voucher to confirm the validity of the voucher.

Voucher module 1416 may store data relating to generated vouchers, redeemed vouchers, bought vouchers, and/or sold vouchers.

Reporting module 1418 may generate reports related to a performance of electronic gaming device 1400, electronic gaming system(s), wager-based game(s), video streams, gaming objects, credit device(s), identification device(s), etc.

In one implementation, reporting module 1418 may reside on a central server and can aggregate and generate real time statistics on betting activities at one or more wager-based games at one or more participating casino's. The aggregate betting statistics may include trends (e.g., aggregate daily wager volume and wager amount by game types, by casinos, and the like), top games with the most payouts, top tables with the most payouts, top search structures used by players, most popular wager-based game(s) by wager volume, most searched for game, wager-based game(s) with least payouts, weekly trends, monthly trends, and other statistics related to game plays, wagers, people, location, and searches.

The information and statistics generated by the server-based reporting module 1418 can be displayed publicly or privately. For example, popular trending and statistical information on wager volume and wager amount for the top ten wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 1420 may track any maintenance that is implemented on electronic gaming device 1400 and/or electronic gaming system 200. Maintenance module 1420 may schedule preventative maintenance and/or request a service call based on a device error.

Player tracking preferences module 1424 may compile and track data associated with a players preferences.

Account module 1432 may include data relating to an account balance, a wager limit, a number of wagers placed, credit limits, any other player information, and/or any other account information.

Data from account module 1432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

In at least one embodiment, at least a portion of the modules discussed in block diagram 1400 may reside locally in gaming terminal 1400. However, in at least some embodiments, the functions performed by these modules may be implemented in one or more remote servers. For instance, modules 1406-420 and 1424 may each be on a remote server, communicating with gaming terminal 1400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 1408 may be implemented in software as a web service provider. Gaming terminal 1400 would make service requests over the web for the available predetermined wager options to be displayed. Regardless of how the modules and their respective functions are implemented, the interoperability with the gaming terminal 1400 is seamless.

In one implementation, reporting module 1418 may reside on a central server and can aggregate and generate real time statistics on betting activities at one or more wager-based games at one or more participating casino's. The aggregate betting statistics may include trends (e.g., aggregate daily wager volume and wager amount by game types, by casinos, and the like), top games with the most payouts, top EGDs with the most payouts, top search structures used by players, most popular wager-based game(s) by wager volume, most searched for game(s), EGDs with least payouts, weekly trends, monthly trends, and other statistics related to game plays, wagers, people, location, and searches.

The information and statistics generated by the server-based reporting module 1418 can be displayed publicly or privately. For example, popular trending and statistical information on wager volume and wager amount for the top ten wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

The present application herein incorporates by reference, in its entirety and for all purposes, U.S. patent application Ser. No. 15/867,298, titled "GAMING SYSTEM HAVING CHANCE UPGRADING AND/OR OTHER TRANSFORM OF PLURAL SYMBOLS ALONG TARGET LINE" by Hemovich et al., filed on 10 Jan. 2018.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

It is claimed:

1. A gaming machine comprising:
a cabinet including an entry that provides access to an interior of the cabinet;
a button panel assembly disposed at an exterior portion of the cabinet, the button panel assembly being removably attachable to the cabinet;
the button panel assembly including a button panel support frame assembly, the button panel support frame assembly including a first set of fasteners attached thereto;
the button panel assembly further including a button panel comprising at least one interface for receiving player input, the button panel further comprising a second set of fasteners attached thereto;
the button panel being attachable to the button panel support frame assembly via engagement of the first set of fasteners with the second set of fasteners;
the button panel further being attachable to the button panel support frame assembly in a manner which does not require access to the interior of the cabinet;
the button panel being completely detachable from the button panel support frame assembly via disengagement of the first set of fasteners from the second set of fasteners; and
the button panel further being detachable from the button panel support frame assembly in a manner which does not require access to the interior of the cabinet.

2. The gaming machine of claim 1:
wherein the button panel is attachable to the button panel support frame assembly via engagement of the first set of fasteners with the second set of fasteners in a manner which does not require the first set of fasteners to be detached or separated from the button panel support frame assembly, and in a manner which does not require the second set of fasteners to be detached or separated from the button panel; and
wherein the button panel is detachable from the button panel support frame assembly via disengagement of the first set of fasteners from the second set of fasteners in a manner which does not require the first set of fasteners to be detached or separated from the button panel support frame assembly, and in a manner which does not require the second set of fasteners to be detached or separated from the button panel.

3. The gaming machine of claim 1:
wherein the first set of fasteners includes a first captive fastener; and
wherein the second set of fasteners includes a second captive fastener.

4. The gaming machine of claim 1:
wherein the button panel assembly further comprises an access panel assembly; and
wherein the access panel assembly is removably attachable to the button panel support frame assembly in a manner which controls access to the second set of fasteners.

5. The gaming machine of claim 1:
wherein the button panel assembly further comprises an access panel assembly;
the access panel assembly being removably attachable to the button panel support frame assembly in a manner which controls access to the second set of fasteners;
the access panel assembly being attachable to the button panel support frame assembly in a manner which prevents access to the second set of fasteners; and
the access panel assembly being detachable from the button panel support frame assembly in a manner which enables access to the second set of fasteners.

6. The gaming machine of claim 1:
wherein the button panel assembly further comprises an access panel assembly;
the access panel assembly being removably attachable to the button panel support frame assembly in a manner which controls access to the second set of fasteners;
the button panel support frame assembly including a first set of connectors;
the access panel assembly including a second set of connectors;
the access panel assembly being attachable to the button panel support frame assembly via engagement of the first set of connectors with the second set of connectors;
the access panel assembly being detachable from the button panel support frame assembly via disengagement of the first set of connectors from the second set of connectors;
the access panel assembly being attachable to the button panel support frame assembly in a manner which prevents access to the second set of fasteners; and
the access panel assembly being detachable from the button panel support frame assembly in a manner which enables access to the second set of fasteners.

7. A gaming machine comprising:
a cabinet including an entry that provides access to an interior of the cabinet;
a button panel assembly disposed at an exterior portion of the cabinet, the button panel assembly being removably attachable to the cabinet;
the button panel assembly including a button panel support frame assembly, the button panel support frame assembly including a first set of fasteners attached thereto;
the button panel assembly further including a button panel comprising at least one interface for receiving player input, the button panel further comprising a second set of fasteners attached thereto;
the button panel being attachable to the button panel support frame assembly via engagement of the first set of fasteners with the second set of fasteners;
the button panel further being attachable to the button panel support frame assembly in a manner which does not require access to the interior of the cabinet;
the button panel being detachable from the button panel support frame assembly via disengagement of the first set of fasteners from the second set of fasteners;
the button panel further being detachable from the button panel support frame assembly in a manner which does not require access to the interior of the cabinet;
wherein the second set of fasteners includes a set of captive, quarter-turn fasteners;
wherein the button panel is attachable to the button panel support frame assembly via engagement of the set of captive, quarter-turn fasteners with the first set of fasteners in a manner which does not require the set of captive, quarter-turn fasteners to be detached or separated from the button panel; and
wherein the button panel is detachable from the button panel support frame assembly via disengagement of the set of captive, quarter-turn fasteners from the first set of fasteners in a manner which does not require the set of captive, quarter-turn fasteners to be detached or separated from the button panel.

8. A gaming machine comprising:
a cabinet including an entry that provides access to an interior of the cabinet;
a button panel assembly disposed at an exterior portion of the cabinet, the button panel assembly being removably attachable to the cabinet;
an electro-mechanical button panel intrusion switch disposed at the interior of the cabinet, the button panel intrusion switch including a first electrical interface for receiving electrical power;
the button panel assembly including a button panel support frame assembly;
the button panel assembly further including a button panel comprising at least one interface for receiving player input, the button panel being removably attachable to the button panel support frame assembly; and
the button panel assembly further including an intrusion lever pivotably mounted to the button panel support frame assembly, the intrusion lever including a first end portion disposed within the button panel assembly, the intrusion lever further including a second end portion disposed within the interior of the cabinet, the second end portion being positioned for engagement with the button panel intrusion switch.

9. The gaming machine of claim 8:
wherein the button panel intrusion switch corresponds to a plunger-type switch which includes a movable plunger for controlling a state of the intrusion switch such that when the plunger is in a retracted position, the state of the intrusion switch is caused to be in a closed state, and when the plunger is in an extended position, the state of the intrusion switch is caused to be in an open state;
wherein the button panel assembly further comprises an access panel, the access panel being removably attachable to the button panel support frame assembly in a manner which controls access to internal components of the button panel assembly; and
wherein the first end portion of the intrusion lever is positioned to detachably engage with a portion of the access panel such that, while the intrusion lever is engaged with the portion of the access panel, the intrusion lever causes the plunger of the intrusion switch to be in the retracted position, and while the intrusion lever is not engaged with the portion of the access panel, the intrusion lever causes the plunger of the intrusion switch to be in the extended position.

10. The gaming machine of claim 8:
the button panel being detachable from the button panel support frame assembly without causing disruption of the electrical power supplied to the intrusion switch; and
the button panel being attachable to the button panel support frame assembly without causing disruption of the electrical power supplied to the intrusion switch.

11. The gaming machine of claim 8:
the button panel being attachable to the button panel support frame assembly in a manner which does not require access to the interior of the cabinet; and
the button panel being detachable from the button panel support frame assembly in a manner which does not require access to the interior of the cabinet.

12. The gaming machine of claim 8:
wherein the button panel intrusion switch corresponds to a plunger-type switch which includes a movable plunger for controlling a state of the intrusion switch such that when the plunger is in a retracted position, the state of the intrusion switch is caused to be in a closed state, and when the plunger is in an extended position, the state of the intrusion switch is caused to be in an open state;

wherein the button panel is removably attachable to the button panel support frame assembly via a first plurality of fasteners; and wherein access to the first plurality of fasteners causes the intrusion lever to engage with the intrusion switch in a manner which causes the intrusion switch to be in the open state.

* * * * *